US012410384B2

(12) United States Patent
Degering et al.

(10) Patent No.: US 12,410,384 B2
(45) Date of Patent: Sep. 9, 2025

(54) WASHING AND CLEANING AGENTS COMPRISING PROTEASE AND AMYLASE

(71) Applicant: Henkel AG & Co. KGaA, Duesseldorf (DE)

(72) Inventors: Christian Degering, Erkrath (DE); Susanne Wieland, Dormagen (DE); Klaus Dorra, Duesseldorf (DE); Britta Strauss, Solingen (DE); Nina Mussmann, Willich (DE); Thomas Weber, Weimar (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 901 days.

(21) Appl. No.: 17/628,906

(22) PCT Filed: Jul. 16, 2020

(86) PCT No.: PCT/EP2020/070134
§ 371 (c)(1),
(2) Date: Jan. 21, 2022

(87) PCT Pub. No.: WO2021/013688
PCT Pub. Date: Jan. 28, 2021

(65) Prior Publication Data
US 2022/0251476 A1 Aug. 11, 2022

(30) Foreign Application Priority Data
Jul. 22, 2019 (EP) ...................................... 19187564

(51) Int. Cl.
*C11D 3/386* (2006.01)
(52) U.S. Cl.
CPC ...... *C11D 3/386* (2013.01); *C12Y 304/21062* (2013.01)
(58) Field of Classification Search
CPC ............................... C12N 9/54; C12N 9/2411
See application file for complete search history.

(56) References Cited

U.S. PATENT DOCUMENTS

| | | | |
|---|---|---|---|
| 4,071,377 A | 1/1978 | Schwuger et al. | |
| 10,941,371 B2 * | 3/2021 | Herbst ..................... | C12N 9/54 |
| 2004/0259222 A1 | 12/2004 | Breves et al. | |
| 2005/0003419 A1 | 1/2005 | Breves et al. | |
| 2009/0170745 A1 | 7/2009 | Merkel et al. | |
| 2009/0275493 A1 | 11/2009 | Siegert et al. | |
| 2014/0295522 A1 | 10/2014 | Mussmann et al. | |
| 2017/0152461 A1 | 6/2017 | Vockenroth et al. | |
| 2017/0247643 A1 | 8/2017 | Eiting et al. | |
| 2019/0144792 A1 | 5/2019 | Herbst et al. | |
| 2019/0185788 A1 | 6/2019 | Jackson et al. | |

FOREIGN PATENT DOCUMENTS

| | | |
|---|---|---|
| CN | 114144507 A | 3/2022 |
| DE | 2412837 A1 | 10/1974 |
| EP | 3502244 A1 | 6/2019 |
| GB | 1243784 A | 8/1971 |
| WO | 9102792 A1 | 3/1991 |
| WO | 9318140 A1 | 9/1993 |
| WO | 9634946 A1 | 11/1996 |
| WO | 0144452 A1 | 6/2001 |
| WO | 0229024 A1 | 4/2002 |
| WO | 03002711 A2 | 1/2003 |
| WO | 03054177 A2 | 7/2003 |
| WO | 03057246 A1 | 7/2003 |
| WO | 03099985 A2 | 12/2003 |
| WO | 2004031338 A1 | 4/2004 |
| WO | 2007079938 A2 | 7/2007 |
| WO | 2007131656 A1 | 11/2007 |
| WO | 2008007319 A2 | 1/2008 |
| WO | 2008086916 A1 | 7/2008 |
| WO | 2009102854 A1 | 8/2009 |
| WO | 2013016368 A1 | 1/2013 |
| WO | 2015149641 A1 | 10/2015 |
| WO | 2016000972 A1 | 1/2016 |
| WO | 2016000973 A1 | 1/2016 |
| WO | 2017215925 A1 | 12/2017 |
| WO | 2018067483 A1 | 4/2018 |

OTHER PUBLICATIONS

Search Report of parallel European patent application No. 19 187 564.0 of Feb. 11, 2020, 6 pages, for information purpose only.
Search Report of parallel PCT application No. PCT/EP2020/070134 of Oct. 7, 2020, 13 pages, for information purpose only.
Siezen, Roland J., Subtilisin Enzymes, Subtilases: Subtilisin-Like Serine Proteases, 1996, pp. 74-93, Plenum Press, New York.
Altschul et al., "Basic Local Alignment Seach Tool", 1990, pp. 403-410, 215, J. Mol. Biol., Academic Press Limited.
Altschul et al., "Gapped BLAST and PSI-BLAST: a new generation of protein database search programs", 1997, pp. 3389-3402, vol. 25, No. 17, Nucleic Acids Research.
Chenna et al., "Multiple sequence alignment with the Clustal series of programs", 2003, pp. 3497-3500, vol. 31, No. 13, Nucleic Acids Research, Oxford University Press.

(Continued)

*Primary Examiner* — Tekchand Saidha
(74) *Attorney, Agent, or Firm* — CANTOR COLBURN LLP

(57) ABSTRACT

A washing or cleaning agent may include at least one amylase and at least one protease with an amino acid sequence having at least 70% sequence identity to the amino acid sequence specified in SEQ ID NO:1 over the entire length thereof and has an amino acid substitution at at least one of the positions corresponding to the positions 12, 43, 122, 127, 154, 156, 160, 211, 212, or 222, in each case based on the numbering according to SEQ ID NO:1. Corresponding cleaning methods and uses of such a washing or cleaning agent for cleaning textiles and/or hard surfaces are also disclosed.

11 Claims, No Drawings
Specification includes a Sequence Listing.

(56) References Cited

OTHER PUBLICATIONS

Notredame et al., "T-Coffee: A Novel Method for Fast and Accurate Multiple Sequence Alignment", 2000, pp. 205-217, J. Mol. Biol., Academic Press.
Gornall et al., "Determination of Serum Proteins by Means of the Biuret Reaction", 1948, pp. 751-766, J. Biol. Chem.
Bender et al., "The Determination of the Concentration of Hydrolytic Enzyme Solutions: a-Chymotrypsin, Trypsin, Papain, Elastase, Subtilisin, and Acetylcholinesterase", 1966, pp. 5890-5913, Journal of the American Chemical Society, 88:24.

\* cited by examiner

SEQUENCE LISTING

<160> NUMBER OF SEQ ID NOS: 8

<210> SEQ ID NO 1
<211> LENGTH: 269
<212> TYPE: PRT
<213> ORGANISM: Bacillus gibsonii

<400> SEQUENCE: 1

Gln Gln Thr Val Pro Trp Gly Ile Thr Arg Val Gln Ala Pro Thr Val
1               5                   10                  15

His Asn Arg Gly Ile Thr Gly Ser Gly Val Lys Val Ala Ile Leu Asp
            20                  25                  30

Thr Gly Ile Ala Gln His Ser Asp Leu Thr Ile Arg Gly Gly Ala Ser
        35                  40                  45

Phe Val Pro Gly Glu Ser Thr Thr Ala Asp Leu Asn Gly His Gly Thr
    50                  55                  60

His Val Ala Gly Thr Val Ala Leu Asn Asn Ser Ile Gly Val Ile
65                  70                  75                  80

Gly Val Ala Pro Ser Ala Asp Leu Tyr Ala Val Lys Val Leu Gly Ala
                85                  90                  95

Asn Gly Arg Gly Ser Val Ser Gly Ile Ala Gln Gly Leu Glu Trp Ala
            100                 105                 110

Ala Thr Asn Asn Met His Ile Ala Asn Met Ser Leu Gly Ser Asp Ala
        115                 120                 125

Pro Ser Thr Thr Leu Glu Arg Ala Val Asn Tyr Ala Thr Ser Arg Gly
    130                 135                 140

Val Leu Val Ile Ala Ala Thr Gly Asn Asn Gly Thr Gly Ser Ile Gly
145                 150                 155                 160

Tyr Pro Ala Arg Tyr Ala Asn Ala Met Ala Val Gly Ala Thr Asp Gln
                165                 170                 175

Asn Asn Arg Arg Ala Ser Phe Ser Gln Tyr Gly Thr Gly Ile Asp Ile
            180                 185                 190

Val Ala Pro Gly Val Gly Ile Gln Ser Thr Tyr Leu Asn Asn Ser Tyr
        195                 200                 205

Ala Ser Met Pro Gly Thr Ser Met Ala Thr Pro His Val Ala Gly Val
    210                 215                 220

Ala Ala Leu Val Lys Gln Lys Asn Pro Ser Trp Asn Ala Thr Gln Ile
225                 230                 235                 240

Arg Asn His Leu Lys Asn Thr Ala Thr Asn Leu Gly Asn Ser Ser Gln
                245                 250                 255

Phe Gly Ser Gly Leu Val Asn Ala Asp Ala Ala Thr Arg
            260                 265

<210> SEQ ID NO 2
<211> LENGTH: 269
<212> TYPE: PRT
<213> ORGANISM: Bacillus lentus

<400> SEQUENCE: 2

Ala Gln Ser Val Pro Trp Gly Ile Ser Arg Val Gln Ala Pro Ala Ala
1 5 10 15

His Asn Arg Gly Leu Thr Gly Ser Gly Val Lys Val Ala Val Leu Asp
20 25 30

Thr Gly Ile Ser Thr His Pro Asp Leu Asn Ile Arg Gly Gly Ala Ser
35 40 45

Phe Val Pro Gly Glu Pro Ser Thr Gln Asp Gly Asn Gly His Gly Thr
50 55 60

His Val Ala Gly Thr Ile Ala Ala Leu Asn Asn Ser Ile Gly Val Leu
65 70 75 80

Gly Val Ala Pro Ser Ala Glu Leu Tyr Ala Val Lys Val Leu Gly Ala
85 90 95

Ser Gly Ser Gly Ser Val Ser Ser Ile Ala Gln Gly Leu Glu Trp Ala
100 105 110

Gly Asn Asn Gly Met His Val Ala Asn Leu Ser Leu Gly Ser Pro Ser
115 120 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Gly Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
                180                 185                 190

Val Ala Pro Gly Val Asn Val Gln Ser Thr Tyr Pro Gly Ser Thr Tyr
                195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Leu
                245                 250                 255

Tyr Gly Ser Gly Leu Val Asn Ala Glu Ala Ala Thr Arg
                260                 265

<210> SEQ ID NO 3
<211> LENGTH: 269
<212> TYPE: PRT
<213> ORGANISM: Bacillus lentus

<400> SEQUENCE: 3

Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
                20                  25                  30

Thr Gly Ile Ser Thr His Pro Asp Leu Asn Ile Arg Gly Gly Ala Ser
            35                  40                  45

Phe Val Pro Gly Glu Pro Ser Thr Gln Asp Gly Asn Gly His Gly Thr
    50                  55                  60

His Val Ala Gly Thr Ile Ala Ala Leu Asn Asn Ser Ile Gly Val Leu
65                  70                  75                  80

Gly Val Ala Pro Ser Ala Glu Leu Tyr Ala Val Lys Val Leu Gly Ala
                85                  90                  95

Asp Gly Arg Gly Ala Ile Ser Ser Ile Ala Gln Gly Leu Glu Trp Ala
                100                 105                 110

Gly Asn Asn Gly Met His Val Ala Asn Leu Ser Leu Gly Ser Pro Ser
            115                 120                 125

Pro Ser Ala Thr Leu Glu Gln Ala Val Asn Ser Ala Thr Ser Arg Gly
    130                 135                 140

Val Leu Val Val Ala Ala Ser Gly Asn Ser Gly Ala Ser Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
                180                 185                 190

Val Ala Pro Gly Val Asn Val Gln Ser Thr Tyr Pro Gly Ser Thr Tyr
                195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile

```
                225                 230                 235                 240
Arg Asn His Leu Lys Asn Thr Ala Thr Ser Leu Gly Ser Thr Asn Leu
                    245                 250                 255

Tyr Gly Ser Gly Leu Val Asn Ala Glu Ala Ala Thr Arg
                260                 265

<210> SEQ ID NO 4
<211> LENGTH: 269
<212> TYPE: PRT
<213> ORGANISM: Bacillus alkalophilus

<400> SEQUENCE: 4

Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
                20                  25                  30

Thr Gly Ile Ser Thr His Pro Asp Leu Asn Ile Arg Gly Gly Ala Ser
            35                  40                  45

Phe Val Pro Gly Glu Pro Ser Thr Gln Asp Gly Asn Gly His Gly Thr
        50                  55                  60

His Val Ala Gly Thr Ile Ala Ala Leu Asn Asn Ser Ile Gly Val Leu
65                  70                  75                  80

Gly Val Ala Pro Asn Ala Glu Leu Tyr Ala Val Lys Val Leu Gly Ala
                85                  90                  95

Ser Gly Ser Gly Ser Val Ser Ser Ile Ala Gln Gly Leu Glu Trp Ala
                100                 105                 110

Gly Asn Asn Gly Met His Val Ala Asn Leu Ser Leu Gly Ser Pro Ser
            115                 120                 125

Pro Ser Ala Thr Leu Glu Gln Ala Val Asn Ser Ala Thr Ser Arg Gly
        130                 135                 140

Val Leu Val Val Ala Ala Ser Gly Asn Ser Gly Ala Gly Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
        195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Leu
                245                 250                 255

Tyr Gly Ser Gly Leu Val Asn Ala Glu Ala Ala Thr Arg
                260                 265

<210> SEQ ID NO 5
<211> LENGTH: 485
<212> TYPE: PRT
<213> ORGANISM: Bacillus sp.

<400> SEQUENCE: 5

His His Asn Gly Thr Asn Gly Thr Met Met Gln Tyr Phe Glu Trp Tyr
1               5                   10                  15

Leu Pro Asn Asp Gly Asn His Trp Asn Arg Leu Asn Ser Asp Ala Ser
```

```
                    20                  25                  30
Asn Leu Lys Ser Lys Gly Ile Thr Ala Val Trp Ile Pro Pro Ala Trp
            35                  40                  45
Lys Gly Ala Ser Gln Asn Asp Val Gly Tyr Gly Ala Tyr Asp Leu Tyr
        50                  55                  60
Asp Leu Gly Glu Phe Asn Gln Lys Gly Thr Val Arg Thr Lys Tyr Gly
 65                  70                  75                  80
Thr Arg Ser Gln Leu Gln Ala Ala Val Thr Ser Leu Lys Asn Asn Gly
                85                  90                  95
Ile Gln Val Tyr Gly Asp Val Val Met Asn His Lys Gly Gly Ala Asp
            100                 105                 110
Ala Thr Glu Met Val Arg Ala Val Glu Val Asn Pro Asn Asn Arg Asn
        115                 120                 125
Gln Glu Val Thr Gly Glu Tyr Thr Ile Glu Ala Trp Thr Arg Phe Asp
        130                 135                 140
Phe Pro Gly Arg Gly Asn Thr His Ser Ser Phe Lys Trp Arg Trp Tyr
145                 150                 155                 160
His Phe Asp Gly Val Asp Trp Asp Gln Ser Arg Arg Leu Asn Asn Arg
                165                 170                 175
Ile Tyr Lys Phe Arg Gly His Gly Lys Ala Trp Asp Trp Glu Val Asp
            180                 185                 190
Thr Glu Asn Gly Asn Tyr Asp Tyr Leu Met Tyr Ala Asp Ile Asp Met
        195                 200                 205
Asp His Pro Glu Val Val Asn Glu Leu Arg Asn Trp Gly Val Trp Tyr
        210                 215                 220
Thr Asn Thr Leu Gly Leu Asp Gly Phe Arg Ile Asp Ala Val Lys His
225                 230                 235                 240
Ile Lys Tyr Ser Phe Thr Arg Asp Trp Ile Asn His Val Arg Ser Ala
                245                 250                 255
Thr Gly Lys Asn Met Phe Ala Val Ala Glu Phe Trp Lys Asn Asp Leu
            260                 265                 270
Gly Ala Ile Glu Asn Tyr Leu Gln Lys Thr Asn Trp Asn His Ser Val
        275                 280                 285
Phe Asp Val Pro Leu His Tyr Asn Leu Tyr Asn Ala Ser Lys Ser Gly
        290                 295                 300
Gly Asn Tyr Asp Met Arg Asn Ile Phe Asn Gly Thr Val Val Gln Arg
305                 310                 315                 320
His Pro Ser His Ala Val Thr Phe Val Asp Asn His Asp Ser Gln Pro
                325                 330                 335
Glu Glu Ala Leu Glu Ser Phe Val Glu Trp Phe Lys Pro Leu Ala
            340                 345                 350
Tyr Ala Leu Thr Leu Thr Arg Glu Gln Gly Tyr Pro Ser Val Phe Tyr
        355                 360                 365
Gly Asp Tyr Tyr Gly Ile Pro Thr His Gly Val Pro Ala Met Arg Ser
        370                 375                 380
Lys Ile Asp Pro Ile Leu Glu Ala Arg Gln Lys Tyr Ala Tyr Gly Lys
385                 390                 395                 400
Gln Asn Asp Tyr Leu Asp His His Asn Ile Ile Gly Trp Thr Arg Glu
                405                 410                 415
Gly Asn Thr Ala His Pro Asn Ser Gly Leu Ala Thr Ile Met Ser Asp
            420                 425                 430
Gly Ala Gly Gly Ser Lys Trp Met Phe Val Gly Arg Asn Lys Ala Gly
        435                 440                 445
```

```
Gln Val Trp Ser Asp Ile Thr Gly Asn Arg Thr Gly Thr Val Thr Ile
    450                 455                 460
Asn Ala Asp Gly Trp Gly Asn Phe Ser Val Asn Gly Gly Ser Val Ser
465                 470                 475                 480
Ile Trp Val Asn Lys
                485

<210> SEQ ID NO 6
<211> LENGTH: 485
<212> TYPE: PRT
<213> ORGANISM: Bacillus sp.

<400> SEQUENCE: 6

His His Asn Gly Thr Asn Gly Thr Met Met Gln Tyr Phe Glu Trp Tyr
1               5                   10                  15
Leu Pro Asn Asp Gly Asn His Trp Asn Arg Leu Arg Ser Asp Ala Ser
                20                  25                  30
Asn Leu Lys Asp Lys Gly Ile Ser Ala Val Trp Ile Pro Pro Ala Trp
            35                  40                  45
Lys Gly Ala Ser Gln Asn Asp Val Gly Tyr Gly Ala Tyr Asp Leu Tyr
50                  55                  60
Asp Leu Gly Glu Phe Asn Gln Lys Gly Thr Ile Arg Thr Lys Tyr Gly
65                  70                  75                  80
Thr Arg Asn Gln Leu Gln Ala Ala Val Asn Ala Leu Lys Ser Asn Gly
                85                  90                  95
Ile Gln Val Tyr Gly Asp Val Val Met Asn His Lys Gly Gly Ala Asp
            100                 105                 110
Ala Thr Glu Met Val Arg Ala Val Glu Val Asn Pro Asn Asn Arg Asn
        115                 120                 125
Gln Glu Val Ser Gly Glu Tyr Thr Ile Glu Ala Trp Thr Lys Phe Asp
    130                 135                 140
Phe Pro Gly Arg Gly Asn Thr His Ser Asn Phe Lys Trp Arg Trp Tyr
145                 150                 155                 160
His Phe Asp Gly Val Asp Trp Asp Gln Ser Arg Lys Leu Asn Asn Arg
                165                 170                 175
Ile Tyr Lys Phe Arg Gly Asp Gly Lys Gly Trp Asp Trp Glu Val Asp
            180                 185                 190
Thr Glu Asn Gly Asn Tyr Asp Tyr Leu Met Tyr Ala Asp Ile Asp Met
        195                 200                 205
Asp His Pro Glu Val Val Asn Glu Leu Arg Asn Trp Gly Val Trp Tyr
    210                 215                 220
Thr Asn Thr Leu Gly Leu Asp Gly Phe Arg Ile Asp Ala Val Lys His
225                 230                 235                 240
Ile Lys Tyr Ser Phe Thr Arg Asp Trp Ile Asn His Val Arg Ser Ala
                245                 250                 255
Thr Gly Lys Asn Met Phe Ala Val Ala Glu Phe Trp Lys Asn Asp Leu
            260                 265                 270
Gly Ala Ile Glu Asn Tyr Leu Asn Lys Thr Asn Trp Asn His Ser Val
        275                 280                 285
Phe Asp Val Pro Leu His Tyr Asn Leu Tyr Asn Ala Ser Lys Ser Gly
    290                 295                 300
Gly Asn Tyr Asp Met Arg Gln Ile Phe Asn Gly Thr Val Val Gln Arg
305                 310                 315                 320
His Pro Met His Ala Val Thr Phe Val Asp Asn His Asp Ser Gln Pro
```

```
                    325                 330                 335

Glu Glu Ala Leu Glu Ser Phe Val Glu Glu Trp Phe Lys Pro Leu Ala
                340                 345                 350

Tyr Ala Leu Thr Leu Thr Arg Glu Gln Gly Tyr Pro Ser Val Phe Tyr
            355                 360                 365

Gly Asp Tyr Tyr Gly Ile Pro Thr His Gly Val Pro Ala Met Lys Ser
        370                 375                 380

Lys Ile Asp Pro Ile Leu Glu Ala Arg Gln Lys Tyr Ala Tyr Gly Arg
385                 390                 395                 400

Gln Asn Asp Tyr Leu Asp His His Asn Ile Ile Gly Trp Thr Arg Glu
                405                 410                 415

Gly Asn Thr Ala His Pro Asn Ser Gly Leu Ala Thr Ile Met Ser Asp
                420                 425                 430

Gly Ala Gly Gly Asn Lys Trp Met Phe Val Gly Arg Asn Lys Ala Gly
            435                 440                 445

Gln Val Trp Thr Asp Ile Thr Gly Asn Arg Ala Gly Thr Val Thr Ile
        450                 455                 460

Asn Ala Asp Gly Trp Gly Asn Phe Ser Val Asn Gly Gly Ser Val Ser
465                 470                 475                 480

Ile Trp Val Asn Lys
            485

<210> SEQ ID NO 7
<211> LENGTH: 485
<212> TYPE: PRT
<213> ORGANISM: Bacillus sp.

<400> SEQUENCE: 7

His His Asn Gly Thr Asn Gly Thr Met Met Gln Tyr Phe Glu Trp His
1               5                   10                  15

Leu Pro Asn Asp Gly Asn His Trp Asn Arg Leu Arg Asp Asp Ala Ser
                20                  25                  30

Asn Leu Arg Asn Arg Gly Ile Thr Ala Ile Trp Ile Pro Pro Ala Trp
            35                  40                  45

Lys Gly Thr Ser Gln Asn Asp Val Gly Tyr Gly Ala Tyr Asp Leu Tyr
    50                  55                  60

Asp Leu Gly Glu Phe Asn Gln Lys Gly Thr Val Arg Thr Lys Tyr Gly
65                  70                  75                  80

Thr Arg Ser Gln Leu Glu Ser Ala Ile His Ala Leu Lys Asn Asn Gly
                85                  90                  95

Val Gln Val Tyr Gly Asp Val Val Met Asn His Lys Gly Gly Ala Asp
                100                 105                 110

Ala Thr Glu Asn Val Leu Ala Val Glu Val Asn Pro Asn Asn Arg Asn
            115                 120                 125

Gln Glu Ile Ser Gly Asp Tyr Thr Ile Glu Ala Trp Thr Lys Phe Asp
    130                 135                 140

Phe Pro Gly Arg Gly Asn Thr Tyr Ser Asp Phe Lys Trp Arg Trp Tyr
145                 150                 155                 160

His Phe Asp Gly Val Asp Trp Asp Gln Ser Arg Gln Phe Gln Asn Arg
                165                 170                 175

Ile Tyr Lys Phe Arg Gly Asp Gly Lys Ala Trp Asp Trp Glu Val Asp
            180                 185                 190

Ser Glu Asn Gly Asn Tyr Asp Tyr Leu Met Tyr Ala Asp Val Asp Met
        195                 200                 205
```

Asp His Pro Glu Val Val Asn Glu Leu Arg Arg Trp Gly Glu Trp Tyr
210                 215                 220

Thr Asn Thr Leu Asn Leu Asp Gly Phe Arg Ile Asp Ala Val Lys His
225                 230                 235                 240

Ile Lys Tyr Ser Phe Thr Arg Asp Trp Leu Thr His Val Arg Asn Ala
            245                 250                 255

Thr Gly Lys Glu Met Phe Ala Val Ala Glu Phe Trp Lys Asn Asp Leu
        260                 265                 270

Gly Ala Leu Glu Asn Tyr Leu Asn Lys Thr Asn Trp Asn His Ser Val
    275                 280                 285

Phe Asp Val Pro Leu His Tyr Asn Leu Tyr Asn Ala Ser Asn Ser Gly
290                 295                 300

Gly Asn Tyr Asp Met Ala Lys Leu Leu Asn Gly Thr Val Val Gln Lys
305                 310                 315                 320

His Pro Met His Ala Val Thr Phe Val Asp Asn His Asp Ser Gln Pro
            325                 330                 335

Gly Glu Ser Leu Glu Ser Phe Val Gln Glu Trp Phe Lys Pro Leu Ala
        340                 345                 350

Tyr Ala Leu Ile Leu Thr Arg Glu Gln Gly Tyr Pro Ser Val Phe Tyr
    355                 360                 365

Gly Asp Tyr Tyr Gly Ile Pro Thr His Ser Val Pro Ala Met Lys Ala
370                 375                 380

Lys Ile Asp Pro Ile Leu Glu Ala Arg Gln Asn Phe Ala Tyr Gly Thr
385                 390                 395                 400

Gln His Asp Tyr Phe Asp His His Asn Ile Ile Gly Trp Thr Arg Glu
            405                 410                 415

Gly Asn Thr Thr His Pro Asn Ser Gly Leu Ala Thr Ile Met Ser Asp
        420                 425                 430

Gly Pro Gly Gly Glu Lys Trp Met Tyr Val Gly Gln Asn Lys Ala Gly
    435                 440                 445

Gln Val Trp His Asp Ile Thr Gly Asn Lys Pro Gly Thr Val Thr Ile
450                 455                 460

Asn Ala Asp Gly Trp Ala Asn Phe Ser Val Asn Gly Gly Ser Val Ser
465                 470                 475                 480

Ile Trp Val Lys Arg
            485

<210> SEQ ID NO 8
<211> LENGTH: 485
<212> TYPE: PRT
<213> ORGANISM: Bacillus sp.

<400> SEQUENCE: 8

His His Asn Gly Thr Asn Gly Thr Met Met Gln Tyr Phe Glu Trp Tyr
1               5                   10                  15

Leu Pro Asn Asp Gly Asn His Trp Asn Arg Leu Asn Ser Asp Ala Ser
            20                  25                  30

Asn Leu Lys Ser Lys Gly Ile Thr Ala Val Trp Ile Pro Pro Ala Trp
        35                  40                  45

Lys Gly Ala Ser Gln Asn Asp Val Gly Tyr Gly Ala Tyr Asp Leu Tyr
    50                  55                  60

Asp Leu Gly Glu Phe Asn Gln Lys Gly Thr Val Arg Thr Lys Tyr Gly
65                  70                  75                  80

Thr Arg Ser Gln Leu Gln Ala Ala Val Thr Ser Leu Lys Asn Asn Gly
            85                  90                  95

```
Ile Gln Val Tyr Gly Asp Val Val Met Asn His Lys Gly Gly Ala Asp
            100                 105                 110
Ala Thr Glu Met Val Arg Ala Val Glu Val Asn Pro Asn Asn Arg Asn
            115                 120                 125
Gln Glu Val Thr Gly Glu Tyr Thr Ile Glu Ala Trp Thr Arg Phe Asp
130                 135                         140
Phe Pro Gly Arg Gly Asn Thr His Ser Ser Phe Lys Trp Arg Trp Tyr
145                     150                 155                 160
His Phe Asp Gly Val Asp Trp Asp Gln Ser Arg Arg Leu Asn Asn Arg
                165                 170                 175
Ile Tyr Lys Phe Arg Gly His Gly Lys Ala Trp Asp Trp Glu Val Asp
            180                 185                 190
Thr Glu Asn Gly Asn Tyr Asp Tyr Leu Met Tyr Ala Asp Ile Asp Met
            195                 200                 205
Asp His Pro Glu Val Val Asn Glu Leu Arg Asn Trp Gly Val Trp Tyr
            210                 215                 220
Thr Asn Thr Leu Gly Leu Asp Gly Phe Arg Ile Asp Ala Val Lys His
225                 230                 235                 240
Ile Lys Tyr Ser Phe Thr Arg Asp Trp Ile Asn His Val Arg Ser Ala
                245                 250                 255
Thr Gly Lys Asn Met Phe Ala Val Ala Glu Phe Trp Lys Asn Asp Leu
            260                 265                 270
Gly Ala Ile Glu Asn Tyr Leu Gln Lys Thr Asn Trp Asn His Ser Val
            275                 280                 285
Phe Asp Val Pro Leu His Tyr Asn Leu Tyr Asn Ala Ser Lys Ser Gly
290                 295                 300
Gly Asn Tyr Asp Met Arg Asn Ile Phe Asn Gly Thr Val Val Gln Arg
305                 310                 315                 320
His Pro Ser His Ala Val Thr Phe Val Asp Asn His Asp Ser Gln Pro
                325                 330                 335
Glu Glu Ala Leu Glu Ser Phe Val Glu Glu Trp Phe Lys Pro Leu Ala
            340                 345                 350
Tyr Ala Leu Thr Leu Thr Arg Glu Gln Gly Tyr Pro Ser Val Phe Tyr
            355                 360                 365
Gly Asp Tyr Tyr Gly Ile Pro Thr His Gly Val Pro Ala Met Arg Ser
            370                 375                 380
Lys Ile Asp Pro Ile Leu Glu Ala Arg Gln Lys Tyr Ala Tyr Gly Pro
385                 390                 395                 400
Gln His Asp Tyr Ile Asp His Pro Asp Val Ile Gly Trp Thr Arg Glu
                405                 410                 415
Gly Asp Ser Ser Ala Ala Lys Ser Gly Leu Ala Ala Leu Ile Thr Asp
            420                 425                 430
Gly Pro Gly Gly Ser Lys Arg Met Tyr Ala Gly Leu Lys Asn Ala Gly
            435                 440                 445
Glu Thr Trp Tyr Asp Ile Thr Gly Asn Arg Ser Asp Thr Val Lys Ile
            450                 455                 460
Gly Ser Asp Gly Trp Gly Glu Phe His Val Asn Asp Gly Ser Val Ser
465                 470                 475                 480
Ile Tyr Val Gln Lys
            485
```

WASHING AND CLEANING AGENTS COMPRISING PROTEASE AND AMYLASE

CROSS-REFERENCE TO RELATED APPLICATIONS

The present application is a national stage entry according to 35 U.S.C. § 371 of PCT Application No. PCT/EP2020/070134 filed on Jul. 16, 2020; which claims priority to European Patent Application Serial No. 19187564.0 filed on Jul. 22, 2019; all of which are incorporated herein by reference in their entirety and for all purposes.

REFERENCE TO A SEQUENCE LISTING SUBMITTED VIA EFS-WEB

The content of the ASCII text file of the sequence listing named "SEQLTXT.txt", which is 26 kb in size was created on Jul. 22, 2019 and electronically submitted via EFS-Web herewith; the sequence listing is incorporated by reference in its entirety.

TECHNICAL FIELD

The disclosure relates to washing or cleaning agents, comprising at least one *Bacillus gibsonii* protease and at least one amylase, the amino acid sequences of which have been modified, in particular with respect to the use in washing and cleaning agents, and/or all sufficiently similar amylases and proteases having a corresponding modification. The corresponding washing and cleaning methods and the use of the agents described herein for cleaning textiles and/or hard surfaces are also part of the disclosure.

BACKGROUND

The use of enzymes in washing and cleaning agents has been established in the prior art for decades. They are used to expand the performance range of the agents in question according to their special activities. These include in particular hydrolytic enzymes such as proteases, amylases, lipases and cellulases. The first three mentioned hydrolyze proteins, starch and fats and thus contribute directly to the removal of dirt. Cellulases are used in particular due to their effect on fabric. Another group of washing and cleaning agent enzymes are oxidative enzymes, in particular oxidases, which, optionally in conjunction with other components, are preferably used to bleach stains or to produce the bleaching agents in situ. In addition to these enzymes, which are subject to continuous optimization, other enzymes such as pectinases, β-glucanases, mannanases or other hemicellulases (glycosidases) are constantly being made available for use in washing and cleaning agents in particular in order to be able to optimally tackle specific stains, to hydrolyze specific vegetable polymers in particular.

Proteases are the longest-established enzymes and are contained in virtually all modern, effective washing and cleaning agents. This makes them one of the technically most important enzymes of all. Of these, in turn, proteases of the subtilisin type (subtilases, subtilopeptidases, EC 3.4.21.62), which are serine proteases due to the catalytically active amino acids, are particularly important. They act as non-specific endopeptidases and hydrolyze any acid amide bonds that are inside peptides or proteins. Their optimum pH is usually in the distinctly alkaline range. An overview of this family is given, e.g., in the article "Subtilases: Subtilisin-like Proteases" by R. Siezen, pages 75-95 in "Subtilisin enzymes," published by R. Bott and C. Betzel, New York, 1996. Subtilases are formed naturally from microorganisms. In particular, the subtilisins formed and secreted by *Bacillus* species are the most significant group of subtilases.

In washing and cleaning agents, proteases are used to break down protein-containing stains on the items to be cleaned. In general, only selected proteases are suitable for use in liquid, surfactant-containing preparations in any case. Many proteases do not exhibit sufficient catalytic performance in such preparations or they are not sufficiently stable. For the use of proteases in cleaning agents, therefore, a high catalytic activity and stability under conditions as they are during a wash cycle is particularly desirable.

Examples of proteases are the subtilisins BPN' from *Bacillus amyloliquefaciens* and Carlsberg from *Bacillus licheniformis*, protease PB92, subtilisins 147 and 309, the protease from *Bacillus lentus*, subtilisin DY, and the enzymes thermitase, proteinase K and proteases TW3 and TW7, which belong to the subtilases but no longer to the subtilisins in the narrower sense. Subtilisin Carlsberg is available in a developed form under the trade name Alcalase® from Novozymes. Subtilisins 147 and 309 are marketed by Novozymes under the trade names Esperase® and Savinase®, respectively. The protease variants marketed under the name BLAP® are derived from the protease from *Bacillus lentus* DSM 5483. Other proteases that can be used are, for example, the enzymes available under the trade names Durazym®, Relase®, Everlase®, Nafizym®, Natalase®, Kannase® and Ovozyme® from Novozymes, the enzymes available under the trade names Purafect®, Purafect® OxP, Purafect® Prime, Excellase® and Properase® from Danisco/Genencor, the enzyme available under the trade name Protosol® from Advanced Biochemicals Ltd., the enzyme available under the trade name Wuxi® from Wuxi Snyder Bioproducts Ltd., the enzymes available under the trade names Proleather® and Protease P® from Amano Pharmaceuticals Ltd., and the enzyme available under the name Proteinase K-16 from Kao Corp. The proteases from *Bacillus gibsonii* and *Bacillus pumilus* which are disclosed in international patent applications WO2008086916 and WO2007131656 are particularly preferably used. Further advantageously usable proteases are disclosed in patent applications WO9102792, WO2008007319, WO9318140, WO0144452, GB1243784, WO9634946, WO2002029024 and WO2003057246. Further proteases that can be used are those which are naturally present in the microorganisms *Stenotrophomonas maltophilia*, in particular *Stenotrophomonas maltophilia* K279a, *Bacillus intermedius* and *Bacillus sphaericus*.

Other enzymes that can be used in washing and cleaning agents are amylases. Synonymous terms can be used for amylases, such as 1,4-α-D-glucan-glucanohydrolase or glycogenase. Amylases which are preferred are α-amylases. Whether or not an enzyme is an α-amylase is decided by its ability to hydrolyze α-(1-4)-glycosidic bonds in polysaccharides, in particular amylose and starch. As a result, they cause starchy stains to break down on the items to be cleaned. Dextrins and from them maltose, glucose and branched oligosaccharides are formed as decomposition products.

Examples of amylases are α-amylases from *Bacillus licheniformis*, *Bacillus amyloliquefaciens* or *Bacillus stearothermophilus*, as well as in particular the developments thereof that have been improved for use in washing or cleaning agents. The enzyme from *Bacillus licheniformis* is available from Novozymes under the name Termamyl® and from Danisco/Genencor under the name Purastar® ST. Development products of this α-amylase are available from Novozymes under the trade names Duramyl® and Termamyl® ultra, from Danisco/Genencor under the name Purastar® OxAm, and from Daiwa Seiko Inc. as Keistase®. The α-amylase from *Bacillus amyloliquefaciens* is marketed by Novozymes under the name BAN®, and derived variants from the α-amylase from *Bacillus stearothermophilus* are also marketed by Novozymes under the names BSG® and Novamyl®. Furthermore, the α-amylases from *Bacillus* sp. A 7-7 (DSM 12368) and the cyclodextrin glucanotransferase (CGTase) from *Bacillus agaradherens* (DSM 9948) should be emphasized for this purpose. Furthermore, the amylolytic enzymes can be used which are disclosed in international patent applications WO2003002711, WO2003054177 and WO2007079938, the disclosure of which is therefore expressly referred to or the disclosure of which is therefore expressly included in the present patent application. Fusion products of all mentioned molecules can also be used. Furthermore, the developments of the α-amylase from *Aspergillus niger* and *A. oryzae*, available under the trade name Fungamyl® from Novozymes, are suitable. Other commercial products that can advantageously be used are, for example, Amylase-LT®, and Stainzyme® or Stainzyme ultra® or Stainzyme plus®, as well as Amplify™ or Amplify Prime™, also from Novozymes. Variants of these enzymes that can be obtained by point mutations can also be used.

The most important criterion in cleaning textiles and/or hard surfaces is the cleaning performance on a wide variety of stains. Even if the cleaning performance of the washing and cleaning agents used today is generally good, the general trend of increasingly using low-temperature programs, however, poses the problem that many of the conventional washing and cleaning agents have insufficient cleaning performance for stubborn stains. Such an inadequate cleaning performance leads to dissatisfaction among consumers and to the fact that such stains are pretreated by consumers, which in turn increases the consumption of water and energy.

There is therefore a need to further improve the cleaning performance of enzyme-containing washing and cleaning agents. Surprisingly, it has now been found that a protease improves the stability and/or the performance of an α-amylase in washing and cleaning agents.

SUMMARY

In a first aspect, a washing or cleaning agent may include at least one first protease and at least one first α-amylase, wherein the protease is a *Bacillus gibsonii* protease which has at least 70% sequence identity with the amino acid sequence specified in SEQ ID NO:1 over the entire length thereof and has an amino acid substitution at at least one of the positions which correspond to the positions 12, 43, 122, 127, 154, 156, 160, 211, 212 and 222, in each case based on the numbering according to SEQ ID NO:1.

A washing or cleaning agent may include at least one first protease and at least one first α-amylase, wherein the protease is a *Bacillus gibsonii* protease which has at least 70% sequence identity with the amino acid sequence specified in SEQ ID NO:1 over the entire length thereof and has at least one of the amino acid substitutions Q12L, I43V, M122L, D127P, N154S, T156A, G160S, M211N, M211L, P212D, P212H or A222S at at least one of the positions which correspond to the positions 12, 43, 122, 127, 154, 156, 160, 211, 212 and 222, in each case based on the numbering according to SEQ ID NO:1.

A method may include producing such a washing or cleaning agent.

The washing or cleaning agent may be used for cleaning textiles and/or hard surfaces, in particular dishes.

An enzyme combination of protease and amylase may be used for increasing the enzyme-based, in particular amylolytic and/or proteolytic, cleaning performance in a washing and/or cleaning agent.

Preferred embodiments provide washing and cleaning agents having improved enzyme-based cleaning performance, in particular with regard to amylase-sensitive stains. Preferred embodiments of amylase and protease combinations also already achieve this advantageous cleaning performance at low temperatures, and in particular in the temperature ranges between 10 and 60° C., preferably between 15 and 50° C., and particularly preferably between 20 and 40° C. Further preferred embodiments of amylase and protease combinations achieve this advantageous cleaning performance in a wide temperature range, for example between 15 and 90° C., and preferably between 20 and 60° C.

These and other aspects, features, and advantages will become apparent to a person skilled in the art through studying the following detailed description and claims. Any feature from one aspect can be used in any other aspect. Furthermore, it will readily be understood that the examples contained herein are intended to describe and illustrate but not to limit the invention and that, in particular, the invention is not limited to these examples.

DETAILED DESCRIPTION

Unless indicated otherwise, all percentages are indicated in terms of wt. %. Numerical ranges that are indicated in the format "from x to y" also include the stated values. If several preferred numerical ranges are indicated in this format, it is readily understood that all ranges that result from the combination of the various endpoints are also included. "At least one," as used herein, means one or more, i.e., 1, 2, 3, 4, 5, 6, 7, 8, 9, 10, 11, 12, 13, 14 or more. The term "washing and cleaning agents" or "washing or cleaning agent," as used herein, is synonymous with the term "agent" and denotes a composition for cleaning textiles and/or hard surfaces, in particular dishes, as explained in the description. "About," "approx." or "approximately," as used herein in relation to a numerical value, relates to the corresponding numerical value ±10%, preferably ±5%.

The inventors surprisingly found that the enzyme-based, in particular amylolytic and/or proteolytic, cleaning performance in washing or cleaning agents can be improved by a combination of at least one protease and at least one α-amylase, wherein the protease is a *Bacillus gibsonii* protease which has at least 70% sequence identity with the amino acid sequence specified in SEQ ID NO:1 over the entire length thereof and has at least one amino acid substitution at at least one of the positions which correspond to the positions 12, 43, 122, 127, 154, 156, 160, 211, 212 or 222 of the protease from *Bacillus gibsonii* according to SEQ ID NO:1, in particular at least one amino acid substitution selected from the group consisting of Q12L, I43V, M122L, D127P, N154S, T156A, G160S, M211N, M211L, P212D, P212H or A222S.

This is particularly surprising insofar as no such combination has previously been associated with an improved enzyme-based cleaning performance of washing or cleaning agents. The combination of protease and α-amylase in washing and cleaning agents results in an improved cleaning performance of the washing and cleaning agent on at least one amylase-sensitive stain. The proteases have a performance-enhancing effect on the amylase also contained in the washing and cleaning agent and consequently make possible improved removal of at least one, and preferably of a plurality of, amylase-sensitive stains on textiles and/or hard surfaces, such as dishes, due, inter alia, to the amylase-stabilizing action thereof.

The proteases used exhibit enzymatic activity, i.e., they are capable of hydrolyzing peptides and proteins, in particular in washing or cleaning agents. A protease used is therefore an enzyme which catalyzes the hydrolysis of amide/peptide bonds in protein/peptide substrates and is thus able to cleave proteins or peptides. Furthermore, a protease is preferably a mature protease, i.e., the catalytically active molecule without signal peptide(s) and/or propeptide(s). Unless stated otherwise, the sequences specified also each refer to mature (processed) enzymes.

In various embodiments, the protease and/or amylase is a free enzyme. This means that the enzyme can act directly with all the components of an agent and, if the agent is a liquid agent, that the enzyme is in direct contact with the solvent of the agent (e.g., water). In other embodiments, an agent may contain enzymes which form an interaction complex with other molecules or contain a "wrapping." In this case, an individual enzyme molecule or a plurality of enzyme molecules may be separated from the other constituents of the agent by a surrounding structure. Such a separating structure may arise from, but is not limited to, vesicles such as a micelle or a liposome. The surrounding structure may also be a virus particle, a bacterial cell or a eukaryotic cell. In various embodiments, an agent may contain cells of *Bacillus* sp. which express the enzymes, or cell culture supernatants of such cells.

Furthermore, in various embodiments, the *Bacillus gibsonii* protease used contains at least one amino acid substitution selected from the group consisting of Q12L, I43V, M122L, D127P, N154S, T156A, G160S, M211N, M211L, P212D, P212H or A222S, in each case based on the numbering according to SEQ ID NO:1. In further preferred embodiments, the protease used contains one of the following amino acid substitution variants: (i) I43V; (ii) M122L, N154S and T156A; (iii) M211N and P212D; (iv) M211L and P212D; (v) G160S; (vi) D127P, M211L and P212D; (vii) P212H; or (viii) Q12L, M122L and A222S, wherein the numbering in each case is based on the numbering according to SEQ ID NO:1.

In a further embodiment, the protease used comprises an amino acid sequence which, over the entire length thereof, is preferably at least 70%, and increasingly preferably at least 71%, 72%, 73%, 74%, 75%, 76%, 77%, 78%, 79%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% and 98.8% identical to the amino acid sequence specified in SEQ ID NO:1, and has, at at least one of the positions corresponding to positions 12, 43, 122, 127, 154, 156, 160, 211, 212 or 222 in the numbering according to SEQ ID NO:1, one or more of the amino acid substitutions 12L, 43V, 122L, 127P, 154S, 156A, 160S, 211N, 211L, 212D, 212H or 222S.

The α-amylase used in the washing or cleaning agents is preferably selected from:
a) an α-amylase which comprises an amino acid sequence which is at least 80%, 81%, 82%, 83%, 84%, 85%, 86%, 87%, 88%, 89%, 90%, 91%, 92%, 93%, 94%, 95%, 96%, 97%, 98%, 99% and 100% identical to the amino acid sequence specified in SEQ ID NO:5 over the entire length thereof and optionally has at least one amino acid substitution at one of the positions 172, 202, 208, 255 and 261 in the numbering according to SEQ ID NO:5, preferably selected from the group consisting of M202L, M202V, M202S, M202T, M202I, M202Q, M202W, S255N, R172Q, and combinations thereof; and/or b) an α-amylase which comprises an amino acid sequence which is at least 60%, 61%, 62%, 63%, 64%, 65%, 66%, 67%, 68%, 69%, 79%, 71%, 72%, 73%, 74%, 75%, 76%, 77%, 78%, 79%, 80%, 81%, 82%, 83%, 84%, 85%, 86%, 87%, 88%, 89%, 90%, 90.5%, 91%, 92%, 93%, 94%, 95%, 96%, 97%, 98%, 99% and 100% identical to the amino acid sequence specified in SEQ ID NO:6 over the entire length thereof and optionally has at least one amino acid substitution at one of the positions 9, 26, 30, 33, 82, 37, 106, 118, 128, 133, 149, 150, 160, 178, 182, 186, 193, 195, 202, 203, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482 and 484 and/or a deletion at one of the positions 183 and 184 in the numbering according to SEQ ID NO:6, preferably at least one amino acid substitution at one of the positions 9, 26, 149, 182, 186, 202, 257, 295, 299, 323, 339, and 345, particularly preferably selected from the group consisting of R118K, D183*, G184*, N195F, R320K, R458K, and combinations thereof; and/or c) an α-amylase which comprises an amino acid sequence which is at least 90%, 91%, 92%, 93%, 94%, 95%, 96%, 97%, 98%, 99% and 100% identical to the amino acid sequence specified in SEQ ID NO:7 over the entire length thereof and optionally has at least one substitution and/or deletion at one of the positions 93, 116, 118, 129, 133, 134, 140, 142, 146, 147, 149, 151, 152, 169, 174, 183, 184, 186, 189, 193, 195, 197, 198, 200, 203, 206, 210, 212, 213, 235, 243, 244, 260, 262, 284, 303, 304, 320, 338, 347, 359, 418, 431, 434, 439, 447, 458, 469, 476 and 477 in the numbering according to SEQ ID NO:7; and/or d) an α-amylase which comprises an amino acid sequence which is at least 89%, 90%, 91%, 92%, 93%, 94%, 95%, 96%, 97%, 98%, 99% and 100% identical to the amino acid sequence specified in SEQ ID NO:8 over the entire length thereof and has at least one deletion at one of the positions 180, 181, 182, 183 and 184 in the numbering according to SEQ ID NO:8, preferably deletions at at least two positions selected from the positions 180+181, 181+182, 182+183 and 183+184 in the numbering according to SEQ ID NO:8, particularly preferably at the positions 183+184 in the numbering according to SEQ ID NO:8, and/or has at least one substitution at one of the positions 405, 421, 422 and 428 in the numbering according to SEQ ID NO:8, selected from the group consisting of I405L, A421H, A422P, A428T, and combinations thereof.

In various embodiments, the amylase comprises an amino acid sequence which is at least 80% identical to the amino acid sequence specified in SEQ ID NO:5 over the entire length thereof and optionally has at least one amino acid substitution at one of the positions 172, 202, 208, 255 and 261 in the numbering according to SEQ ID NO:5, preferably selected from the group consisting of M202L, M202V, M202S, M202T, M202I, M202Q, M202W, S255N, R172Q, and combinations thereof. Amylases are preferably used which have an amino acid substitution at two, preferably three, of the above-mentioned positions, in particular a substitution at position 202 selected from M202L, M202V, M202S, M202T, M202I, M202Q, M202W, a substitution at position 255, in particular S255N, and a substitution at position 172, in particular R172Q. The M202L and M202T mutants are very particularly preferred.

In various embodiments, the amylase comprises an amino acid sequence which is at least 60% identical to the amino acid sequence specified in SEQ ID NO:6 over the entire length thereof and optionally has at least one amino acid substitution at one of the positions 9, 26, 30, 33, 82, 37, 106, 118, 128, 133, 149, 150, 160, 178, 182, 186, 193, 195, 202, 203, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482 and 484 and/or a deletion at one of the positions 183 and 184 in the numbering according to SEQ ID NO:6, preferably at least one amino acid substitution at one of the positions 9, 26, 149, 182, 186, 202, 257, 295, 299, 323, 339 and 345, particularly preferably selected from the group consisting of R118K, D183*, G184*, N195F, R320K, R458K, and combinations thereof. In various preferred embodiments, the amylase in the numbering according to SEQ ID NO:6 has amino acid substitutions at three or more of the positions 9, 26, 149, 182, 186, 202, 257, 295, 299, 323, 339 and 345 and optionally one or more, preferably all, of the substitutions and/or deletions at the positions: 118, 183, 184, 195, 320 and 458, particularly preferably R118K, D183*, G184*, N195F, R320K and/or R458K. In particularly preferred embodiments, the amylase in the numbering according to SEQ ID NO:6 has the following amino acid substitutions and/or deletions: M9L+M323T; M9L+M202L/T/V/I+M323T; M9L+N195F+M202L/T/V/I+M323T; M9L+R118K+D183*+G184*+R320K+M323T+R458K; M9L+R118K+D183*+G184*+M202L/T/V/I+R320K+M323T+R458K; M9L+G149A+G182T+G186A+M202L+T257I+Y295F+N299Y+M323T+A339S+E345R; M9L+G149A+G182T+G186A+M202I+T257I+Y295F+N299Y+M323T+A339S+E345R; M9L+R118K+G149A+G182T+D183*+G184*+G186A+M202L+T257I+Y295F+N299Y+R320K+M323T+A339S+E345R+R458K; M9L+R118K+G149A+G182T+D183*+G184*+G186A+N195F+M202L+T257I+Y295F+N299Y+R320K+M323T+A339S+E345R+R458K; M9L+R118K+G149A+G182T+D183*+G184*+G186A+M202I+T257I+Y295F+N299Y+R320K+M323T+A339S+E345R+R458K; M9L+R118K+D183*+D184*+N195F+M202L+R320K+M323T+R458K; M9L+R118K+D183*+D184*+N195F+M202T+R320K+M323T+R458K; M9L+R118K+D183*+D184*+N195F+M202I+R320K+M323T+R458K; M9L+R118K+D183*+D184*+N195F+M202V+R320K+M323T+R458K; M9L+R118K+N150H+D183*+D184*+N195F+M202L+V214T+R320K+M323T+R458K; or M9L+R118K+D183*+D184*+N195F+M202L+V214T+R320K+M323T+E345N+R458K.

A particularly preferred amylase is the variant which is commercially available under the trade name Stainzyme Plus™ (Novozymes A/S, Bagsvaerd, Denmark).

In various embodiments, the amylase comprises an amino acid sequence which is at least 90% identical to the amino acid sequence specified in SEQ ID NO:7 over the entire length thereof and optionally has at least one substitution and/or deletion at one of the positions 93, 116, 118, 129, 133, 134, 140, 142, 146, 147, 149, 151, 152, 169, 174, 183, 184, 186, 189, 193, 195, 197, 198, 200, 203, 206, 210, 212, 213, 235, 243, 244, 260, 262, 284, 303, 304, 320, 338, 347, 359, 418, 431, 434, 439, 447, 458, 469, 476 and 477 in the numbering according to SEQ ID NO:7. Preferred amino acid substitutions in this regard comprise: E260A/D/C/Q/L/M/F/P/S/W/V/G/H/I/K/N/R/T/Y, G304R/K/E/Q, W140Y/F, W189E/G/T, D134E, F262G/P, W284D/H/F/Y/R, W347H/F/Y, W439R/G, G476E/Q/R/K, G477E/Q/K/M/R, N195F/Y, N197F/L, Y198N, Y200F, Y203F, I206H/L/N/F/Y, H210Y, E212V/G, V213A, M116T, Q129L, G133E, E134Y, K142R, P146S, G147E, G149R, N151R, Y152H, Q169E, N174R, A186R, Y243F, S244Q, G303V, R320N, R359I, N418D and A447V.

In various embodiments, the amylase comprises an amino acid sequence which is at least 89%, and increasingly preferably at least 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99%, 99.5%, 100%, identical to the sequence specified in SEQ ID NO:8 over the entire length thereof and has a deletion at one or more of the positions 180, 181, 182, 183 and 184 in the numbering according to SEQ ID NO:8. A deletion of two positions selected from 180+181, 181+182, 182+183 and 183+184 is particularly preferred, and deletions at positions 183+184 in the numbering according to SEQ ID NO:8 are very particularly preferred, in particular preferably the deletions H183*+G184*. Preferably, such an α-amylase also has an amino acid substitution at one or more of the positions 405, 421, 422 and 428 in the numbering according to SEQ ID NO:8. One or more of the substitutions I405L, A421H, A422P and A428T are particularly preferred. In a particularly preferred embodiment, the α-amylase has the deletions H183*+G184* and additionally the substitutions I405L, A421H, A422P, and A428T in the numbering according to SEQ ID NO:8.

In various preferred embodiments, washing or cleaning agents can contain at least one second amylase and/or at least one second protease, wherein the second amylase is different from the first amylase and is selected from the above-mentioned group and the second protease is different from the first protease.

If two amylases are contained, these can preferably be used in a mass ratio of from 50:1 to 1:50, preferably from 30:1 to 1:10 (in each case based on the amount of active protein amylase 1 to amylase 2). Using a first amylase in a ratio to a second amylase of from 20:1 to 2:1, preferably 15:1 to 3:1, particularly preferably 12:1 to 5:1, for example 10:1, is in particular preferred.

The at least one second protease is preferably selected from the group consisting of
a) a protease which comprises an amino acid sequence which is at least 80%, 81%, 82%, 83%, 84%, 85%, 86%, 87%, 88%, 89%, 90%, 91%, 92%, 93%, 94%, 95%, 96%, 97%, 98%, 99% and 100% identical to the amino acid sequence specified in SEQ ID NO:2 over the entire length thereof and has at least one amino acid substitution at one of the positions 9, 15, 66, 212 and 239 in the numbering according to SEQ ID NO:2, preferably selected from the group consisting of S9R, A15T, V66A, N212D, Q239R, and combinations thereof; and/or
b) a protease which comprises an amino acid sequence which is at least 80%, 81%, 82%, 83%, 84%, 85%, 86%, 87%, 88%, 89%, 90%, 91%, 92%, 93%, 94%, 95%, 96%, 97%, 98%, 99% and 100% identical to the amino acid sequence specified in SEQ ID NO:2 over the entire length thereof and has an amino acid substitution at position 97 and an insertion of an amino acid between the amino acids at positions 97 and 98 in the numbering according to SEQ ID NO:2, preferably selected from S97A and/or S97AD; and/or c) a protease which comprises an amino acid sequence which is at least 80%, 81%, 82%, 83%, 84%, 85%, 86%, 87%, 88%, 89%, 90%, 91%, 92%, 93%, 94%, 95%, 96%, 97%, 98%, 99% and 100% identical to the amino acid sequence specified in SEQ ID NO:3 over the entire length thereof and optionally has at least one amino acid substitution at one of the positions 3, 4, 99 and 199 in the numbering according to SEQ ID NO:3, in particular the amino acid substitution R99E or R99D, and optionally additionally at least one amino acid substitution selected from the group consisting of S3T, V4I, V199I, and combinations thereof; and/or d) a protease which comprises an amino acid sequence which is at least 80%, 81%, 82%, 83%, 84%, 85%, 86%, 87%, 88%, 89%, 90%, 91%, 92%, 93%, 94%, 95%, 96%, 97%, 98%, 99% and 100% identical to the amino acid sequence specified in SEQ ID NO:4 over the entire length thereof and optionally has at least one amino acid substitution at one of the positions 32, 33, 48-54, 58-62, 94-107, 116, 123-133, 150, 152-156, 158-161, 164, 169, 175-186, 197, 198 and 203-216 in the numbering according to SEQ ID NO:4, in particular at least one amino acid substitution at one of the positions 116, 126, 127, 128 and 160 in the numbering according to SEQ ID NO:4, preferably at least one amino acid substitution selected from the group consisting of G116V, S126L, P127Q, S128A, and combinations thereof.

In various embodiments, the at least one second protease comprises an amino acid sequence which is at least 81%, 82%, 83%, 84%, 85%, 86%, 87%, 88%, 89%, 90%, 91%, 92%, 93%, 94%, 95%, 96%, 97%, 98%, 99% or 100% identical to the amino acid sequence specified in SEQ ID NO:2 over the entire length thereof and has at least one amino acid substitution at one of the positions 9, 15, 66, 212 and 239 in the numbering according to SEQ ID NO:2, preferably selected from the group consisting of S9R, A15T, V66A, N212D, Q239R, and combinations thereof. A variant having at least one, preferably two, in particular three, particularly preferably four, or very particularly preferably five, of the amino acid substitutions selected from S9R, A15T, V66A, N212D and Q239R in the numbering according to SEQ ID NO:2 is particularly preferably used. The following combinations are preferred: S9R+V66A+N212D+Q239R; S9R+A15T+N212D+Q239R; S9R+A15T+V66A+Q239R; S9R+A15T+V66A+N212D; A15T+V66A+N212D+Q239R; S9R+A15T+V66A; S9R+A15T+N212D; S9R+A15T+Q239R; S9R+N212D+Q239R; S9R+V66A+N212D; S9R+V66A+Q239R; A15T+V66A+N212D; A15T+V66A+Q239R; A15T+N212D+Q239R; V66A+N212D+Q239R; S9R+A15T; S9R+V66A; S9R+N212D; S9R+Q239R; A15T+V66A; A15T+N212D; A15T+Q239R; V66A+N212D; V66A+Q239R; N212D+Q239R.

In various embodiments, the at least one second protease is a variant of the protease having the amino acid sequence which is specified in SEQ ID NO:2 and has an amino acid substitution at the position 97 and an insertion of an amino acid between the amino acids at positions 97 and 98 in the numbering according to SEQ ID NO:2, preferably selected from S97A and/or S97AD. Further variants that can be used are those which have an amino acid sequence which is at least 81%, 82%, 83%, 84%, 85%, 86%, 87%, 88%, 89%, 90%, 91%, 92%, 93%, 94%, 95%, 96%, 97%, 98% or 99% identical to the amino acid sequence specified in SEQ ID NO:2, wherein these variants have one or both of the above-mentioned mutations at the positions 97 and 98. Those which have both mutations are preferred.

In various embodiments, the at least one second protease comprises an amino acid sequence which is at least 80%, preferably at least 90%, in particular 100%, identical to the amino acid sequence specified in SEQ ID NO:3 and optionally has at least one amino acid substitution on one, two, three or four of the following positions 3, 4, 99 and 199 in the numbering according to SEQ ID NO:3. Proteases which have an amino acid substitution at two, preferably three or more, in particular four, of the positions mentioned above are preferably used. Further variants that can be used are those which have an amino acid sequence which is at least 81%, 82%, 83%, 84%, 85%, 86%, 87%, 88%, 89%, 90%, 91%, 92%, 93%, 94%, 95%, 96%, 97%, 98% or 99% identical to the amino acid sequence specified in SEQ ID NO:3 and have at least one amino acid substitution at one of the following positions 3, 4, 99 and 199. Particularly preferably, such a protease has an amino acid sequence which is at least 80% identical to the amino acid sequence specified in SEQ ID NO:3 over the total length thereof and has the amino acid substitution R99E or R99D and optionally additionally at least one or two, preferably all three, of the amino acid substitutions S3T, V4I and V199I in the numbering according to SEQ ID NO:3. Such a protease preferably has an amino acid sequence which has at least one, preferably a plurality, in particular each, of the following amino acid substitutions R99E/D, S3T, V4I and/or V199I in the numbering according to SEQ ID NO:3.

In various embodiments, combinations of two proteases are used in a mass ratio, in each case based on active protein, of from 10:1 to 1:10, preferably 5:1 to 1:5, in particular from 3:1 to 1:1, for example 2:1.

The feature whereby an enzyme has the stated substitutions means that it contains at least one of the corresponding amino acids at the corresponding positions, i.e., not all of the 10 positions are otherwise mutated or deleted, for example by fragmentation of the enzyme.

Advantageous positions for sequence alterations, in particular substitutions, of the protease from *Bacillus gibsonii* that are of particular significance when transferred to homologous positions of the proteases used and impart advantageous functional properties to the protease are therefore the positions which correspond to the positions 12, 43, 122, 127, 154, 156, 160, 211, 212 and 222 in SEQ ID NO:1 in an alignment, i.e., in the numbering according to SEQ ID NO:1. At the positions mentioned, the following amino acid functional groups are present in the wild-type molecule of the protease from *Bacillus gibsonii*: Q12, I43, M122, D127, N154, T156, G160, M211, P212 and A222.

The identity of nucleic acid or amino acid sequences is determined by a sequence comparison. This sequence comparison is based on the BLAST algorithm established and commonly used in the prior art (cf., e.g., Altschul et al. (1990) "Basic local alignment search tool," J. Mol. Biol. 215:403-410, and Altschul et al. (1997): "Gapped BLAST and PSI-BLAST: a new generation of protein database search programs," Nucleic Acids Res., 25:3389-3402) and occurs in principle by similar sequences of nucleotides or amino acids in the nucleic acid or amino acid sequences being assigned to one another. A tabular assignment of the positions concerned is referred to as alignment. Another algorithm available in the prior art is the FASTA algorithm. Sequence comparisons (alignments), in particular multiple sequence comparisons, are created using computer programs. The Clustal series (cf., e.g., Chenna et al. (2003) "Multiple sequence alignment with the Clustal series of programs," Nucleic Acid Res. 31:3497-3500), T-Coffee (c.f., e.g., Notredame et al. (2000) "T-Coffee: A novel method for multiple sequence alignments," J. Mol. Biol. 302:205-217) or programs based on these programs or algorithms, for example, are frequently used. Sequence comparisons (alignments) using the computer program Vector NTI® Suite 10.3 (Invitrogen Corporation, 1600 Faraday Avenue, Carlsbad, California, USA) with the predetermined standard parameters, the AlignX module of which program for the sequence comparisons is based on ClustalW, are also possible. Unless stated otherwise, the sequence identity specified herein is determined by the BLAST algorithm.

Such a comparison also allows conclusions to be drawn regarding the similarity of the compared sequences. It is usually indicated in percent identity, i.e., the proportion of identical nucleotides or amino acid functional groups in said sequences or in an alignment of corresponding positions. The broader concept of homology takes conserved amino acid exchanges into account in the case of amino acid sequences, i.e., amino acids having similar chemical activity, since they usually perform similar chemical activities within the protein. Therefore, the similarity of the compared sequences may also be stated as percent homology or percent similarity. Identity and/or homology information can be provided regarding whole polypeptides or genes or only regarding individual regions. Homologous or identical regions of different nucleic acid or amino acid sequences are therefore defined by matches in the sequences. Such regions often have identical functions. They can be small and comprise only a few nucleotides or amino acids.

Often, such small regions perform essential functions for the overall activity of the protein. It may therefore be expedient to relate sequence matches only to individual, optionally small, regions. Unless stated otherwise, however, identity or homology information in the present application relates to the entire length of the particular nucleic acid or amino acid sequence indicated. The indication that an amino acid position corresponds to a numerically designated position in SEQ ID NO:1 therefore means that the corresponding position is associated with the numerically designated position in SEQ ID NO:1 in an alignment as defined above.

The washing or cleaning agent may include at least one protease and at least one α-amylase, wherein the protease can be obtained from a protease as the starting molecule by one or more conservative amino acid substitutions. The term "conservative amino acid substitution" means the exchange (substitution) of one amino acid functional group for another amino acid functional group, with this exchange not resulting in a change to the polarity or charge at the position of the exchanged amino acid, e.g., the exchange of a nonpolar amino acid functional group for another nonpolar amino acid functional group. Conservative amino acid substitutions comprise, for example: G=A=S, 1=V=L=M, D=E, N=Q, K=R, Y=F, S=T, G=A=I=V=L=M=Y=F=W=P=S=T.

The washing or cleaning agent may include at least one protease and at least one α-amylase, wherein the protease can be obtained from a protease as a starting molecule by fragmentation, deletion mutagenesis, insertion mutagenesis or substitution mutagenesis and comprises an amino acid sequence which matches the starting molecule over a length of at least 50, 60, 70, 80, 90, 100, 110, 120, 130, 140, 150, 160, 170, 180, 190, 200, 210, 220, 230, 240, 250, 260, 261, 262, 263, 264, 265, 266, 267, 268 or 269 contiguous amino acids.

For instance, it is possible to delete individual amino acids at the termini or in the loops of the enzyme without the enzymatic activity being lost or diminished in the process. Furthermore, such fragmentation, deletion mutagenesis, insertion mutagenesis or substitution mutagenesis can also, for example, reduce the allergenicity of the enzymes in question and thus improve their overall applicability. Advantageously, the enzymes retain their enzymatic activity even after mutagenesis, i.e., their enzymatic activity corresponds at least to that of the starting enzyme. Substitutions can also exhibit advantageous effects. Both single and a plurality of contiguous amino acids can be exchanged for other amino acids.

A protease and/or amylase can additionally be stabilized, in particular by one or more mutations, for example substitutions, or by coupling to a polymer. An increase in stability during storage and/or during use, for example in the cleaning process, leads to longer enzymatic activity and thus improves the cleaning performance. In principle, all stabilization options which are described in the prior art and/or are appropriate are considered. The stabilizations which are achieved by mutations of the enzyme itself are preferred, since such stabilizations do not require any further work steps following the recovery of the enzyme. Further possibilities for stabilization are, e.g.:
    altering the binding of metal ions, in particular the calcium binding sites, for example by exchanging one or more of the amino acid(s) that are involved in the calcium binding with one or more negatively charged amino acids and/or by introducing sequence alterations in at least one of the sequences of the two amino acids arginine and glycine;
    protecting against the influence of denaturing agents such as surfactants by mutations that cause an alteration of the amino acid sequence on or at the surface of the protein;
    exchanging amino acids near the N-terminus with those likely to contact the rest of the molecule via non-covalent interactions, thus contributing to the maintenance of the globular structure.

Preferred embodiments are those in which the enzyme is stabilized in several ways since a plurality of stabilizing mutations act additively or synergistically.

The protease as described above, which is characterized in that it has at least one chemical modification. A protease having such an alteration is referred to as a derivative, i.e., the protease is derivatized. Derivatives, within the meaning of the present application, shall thus be understood to mean those proteins in which the pure amino acid chain has been chemically modified. Such derivatizations can be achieved, e.g., in vivo by the host cell that expresses the protein. In this regard, couplings of low-molecular-weight compounds such as lipids or oligosaccharides are particularly noteworthy. However, the derivatizations may also be carried out in vitro, for example by the chemical conversion of a side chain of an amino acid or by covalent bonding of another compound to the protein. For example, it is possible to couple amines to carboxyl groups of an enzyme in order to alter the isoelectric point. Another such compound may also be another protein that is bound to a protein via bifunctional chemical compounds, for example. Derivatization is likewise understood to mean the covalent bonding to a macromolecular carrier or also a non-covalent inclusion in suitable macromolecular cage structures. Derivatizations may, e.g., affect the substrate specificity or bonding strength to the substrate or cause a temporary blockage of the enzymatic activity when the coupled substance is an inhibitor. This can be expedient, e.g., for the period of storage. Such modifications may further affect the stability or enzymatic activity. They can also be used to reduce the allergenicity and/or immunogenicity of the protein and for example increase its skin compatibility. For example, couplings with macromolecular compounds, for example polyethylene glycol, can improve the protein in terms of stability and/or skin compatibility. Derivatives of a protein can also be understood in the broadest sense to mean preparations of these proteins. Depending on the recovery, processing or preparation, a protein can be socialized with various other substances, e.g., from the culture of the producing microorganisms. A protein may also have been deliberately added to other substances, e.g., to increase its storage stability. This is also irrespective of whether or not it actually exhibits this enzymatic activity in a particular preparation. This is because it may be desired that it has no or only low activity during storage, and exhibits its enzymatic function only at the time of use. This can be controlled via appropriate accompanying substances, for example.

Numerous proteases and in particular subtilisins are formed as so-called preproteins, i.e., together with a propeptide and a signal peptide, where the function of the signal peptide is usually to ensure the release of the protease from the cell producing it into the periplasm or the medium surrounding the cell, and the propeptide is usually necessary for the protease to fold correctly. The signal peptide and the propeptide are usually the N-terminal part of the preprotein. The signal peptide is cleaved off from the rest of the protease under natural conditions by a signal peptidase. The correct final folding of the protease, supported by the propeptide, then takes place. The protease is then in its active form and cleaves off the propeptide itself. After the propeptide has been cleaved off, the then-mature protease, in particular subtilisin, carries out its catalytic activity without the N-terminal amino acids originally present. For technical applications in general and, the mature proteases, i.e., the enzymes processed after their production, are preferred over the preproteins. The proteases can also be modified by the cells producing them after the production of the polypeptide chain, for example by attaching sugar molecules, formylations or aminations, etc. Such modifications are post-translational modifications and can, but do not have to, have an influence on the function of the protease.

"Variant," as used herein, refers to naturally or artificially generated variations of a native enzyme which have an amino acid sequence which is modified from the reference form. In addition to the amino acid alterations discussed above, enzymes can have other amino acid alterations, in particular amino acid substitutions, insertions or deletions. Such enzymes are, for example, developed by targeted genetic alteration, i.e., by mutagenesis methods, and optimized for specific applications or with regard to specific properties (for example with regard to their catalytic activity or stability, etc.). Furthermore, nucleic acids can be introduced into recombination approaches and can thus be used to generate completely new types of enzymes or other polypeptides. The aim is to introduce targeted mutations such as substitutions, insertions or deletions into the known molecules in order, for example, to improve the cleaning performance of enzymes. For this purpose, in particular the surface charges and/or the isoelectric point of the molecules and thus their interactions with the substrate can be altered. For instance, the net charge of the enzymes can be altered in order to influence the substrate binding, in particular for use in washing and cleaning agents. Alternatively or additionally, one or more corresponding mutations can increase the stability or catalytic activity of the enzyme and thus improve its cleaning performance. Advantageous properties of individual mutations, e.g., individual substitutions, can complement one another. A protease that has already been optimized with regard to certain properties can therefore be further developed, for example with regard to its stability towards surfactants and/or bleaching agents and/or other components.

For the description of substitutions relating to exactly one amino acid position (amino acid exchanges), the following convention is used herein: first, the naturally occurring amino acid is designated in the form of the internationally used one-letter code, followed by the associated sequence position and finally the inserted amino acid. A plurality of exchanges within the same polypeptide chain are separated by slashes. For insertions, additional amino acids are named following the sequence position. In the case of deletions, the missing amino acid is replaced by a symbol, for example a star or a dash, or a Δ is indicated before the corresponding position. For example, P14H describes the substitution of proline at position 14 by histidine, P14HT the insertion of threonine after the amino acid histidine at position 14 and P14* or ΔP14 the deletion of proline at position 14. This nomenclature is known to a person skilled in the art of enzyme technology.

The amino acid positions are defined by an alignment of the amino acid sequence of a protease used with the amino acid sequence of the protease from *Bacillus gibsonii*, as indicated in SEQ ID NO:1. Furthermore, the assignment of the positions depends on the mature protein. This assignment is also to be used in particular if the amino acid sequence of a protease comprises a higher number of amino acid functional groups than the protease from *Bacillus gibsonii* according to SEQ ID NO:1. Proceeding from the above-mentioned positions in the amino acid sequence of the protease from *Bacillus gibsonii*, the alteration positions in a protease used are those which are assigned to precisely these positions in an alignment.

In a further embodiment, the protease used is characterized in that the cleaning performance thereof is not significantly reduced compared with that of a protease comprising an amino acid sequence which corresponds to the amino acid sequence specified in SEQ ID NO:1, i.e., has at least 80% of the reference washing performance, preferably at least 100%, more preferably at least 110% or more.

Washing or cleaning performance is understood to mean the ability of a washing or cleaning agent to partly or completely remove existing dirt. Both the washing or cleaning agent, which comprises the enzyme combination of amylase and protease, or the washing or cleaning liquor formed by this agent, and the protease and amylase themselves exhibit a particular cleaning performance in each case. The cleaning performance of the enzyme thus contributes to the cleaning performance of the agent or the washing or cleaning liquor formed by the agent.

Primarily the cleaning performance of the amylase will be highlighted, the synergistic effect of the protease being shown indirectly by the improved cleaning performance of the amylase on amylase-sensitive stains.

Washing or cleaning liquor is understood to mean the ready-to-use solution which contains the washing or cleaning agent and acts on the textiles or hard surfaces and thus comes into contact with the stains present on the textiles or hard surfaces. The washing or cleaning liquor is usually created when the washing or cleaning process begins and the washing or cleaning agent is diluted with water, for example in a washing machine or dishwasher or in another suitable container.

The cleaning performance of a washing agent is determined in a washing system which contains a washing agent in a dosage between 3.5 and 6.5 grams per liter of washing liquor as well as the combination of protease and the amylase. The proteases to be compared are used in the same concentration (based on active protein). The cleaning performance of the amylase with regard to amylase-sensitive stains is determined by measuring the degree of whiteness of the washed textiles. The washing process takes place for 70 minutes at a temperature of 40° C., the water having a water hardness of between 13.5 and 16.5° (German hardness). The concentration of the protease in the washing agent intended for this washing system is 0.001 to 0.1 wt. %, preferably 0.01 to 0.06 wt. %, based on active protein. The concentration of the amylase in the washing agent intended for this washing system is 0.001 to 0.15 wt. %, preferably 0.005 to 0.012 wt. % based on active protein.

A preferred liquid washing agent for such a washing system has the following composition (all information in percent by weight): 0.3 to 0.5% xanthan gum, 0.2 to 0.4% anti-foaming agent, 6 to 7% glycerol, 0.3 to 0.5% ethanol, 4 to 7% FAEOS (fatty alcohol ether sulfate), 5 to 15% non-ionic surfactants, 5 to 15% anionic surfactants (LAS), 1% boric acid, 1 to 4% sodium citrate (dihydrate), 2 to 4% soda, 2 to 6% coconut fatty acids, 0.5 to 2.5% HEDP (1-hydroxyethane-(1,1-diphosphonic acid)), 0 to 0.4% PVP (polyvinylpyrrolidone), 0 to 0.15% optical brighteners, 0 to 0.001% dye, the remainder being demineralized water. Preferably, the dosage of the liquid washing agent is between 3.5 and 6.0 grams per liter of washing liquor, for example 4.7, 4.9 or 5.9 grams per liter of washing liquor. Washing preferably takes place in a pH range between pH 8 and pH 10.5, preferably between pH 8 and pH 9.

A preferred powder washing agent for such a washing system has the following composition (all information in percent by weight): 10% linear alkylbenzene sulfonate (sodium salt), 1.5% $C_{12-18}$ fatty alcohol sulfate (sodium salt), 2.0% $C_{12-18}$ fatty alcohol having 7 EO, 20% sodium carbonate, 6.5% sodium hydrogen carbonate, 4.0% amorphous sodium silicate, 17% sodium carbonate peroxohydrate, 4.0% TAED, 3.0% polyacrylate, 1.0% carboxymethyl cellulose, 1.0% phosphonate, 27% sodium sulfate, the remainder being suds suppressors, optical brighteners, fragrances. The dosage of the powdered washing agent is preferably between 4.5 and 7.0 grams per liter of washing liquor, for example and particularly preferably 4.7 grams per liter of washing liquor, or 5.5, 5.9 or 6.7 grams per liter of washing liquor. Washing in a pH range between pH 9 and pH 11 is preferred.

The degree of whiteness, i.e., the lightening of stains, as a measure of the cleaning performance is preferably determined by optical measuring methods, preferably photometrically. A suitable device for this purpose is for example the Minolta CM508d spectrometer. Usually, the devices used for the measurement are calibrated beforehand with a white standard, preferably a supplied white standard.

The cleaning performance of a dishwashing detergent can be determined in a system which contains an automatic dishwashing detergent in a dosage as specified herein as well as the enzyme combination of protease and amylase, wherein the proteases to be compared are used in the same concentration (based on active protein) and the cleaning performance with regard to tea, meat, spaghetti and/or creme brûlée stains is determined according to the IKW method in a Miele GSL (program 45° C., 21° dH). The concentration of the enzyme in the agent intended for this washing system is 0.001 to 0.1 wt. %, preferably 0.01 to 0.06 wt. % based on active, purified protein.

TABLE 1

Liquid dishwashing detergent (two-component formulation):

| | Active substance content in wt. % |
|---|---|
| Enzyme Phase (EP) - Preparation A | |
| Phosphonate (e.g., HEDP), if permitted by regulations | 0.00-7.50 |
| $CaCl_2$ | 0.05-1.50 |
| Amylase-containing enzyme composition (tq) | 0.00-4.00 |
| Protease-containing enzyme composition (tq) | 0.00001-10 |
| Sorbitol | 2.00-10.00 |
| Sulfonic acid group-containing polymer | 0.00-12.00 |
| Thickener (based on acrylate or xanthan gum) | 0.01-6.00 |
| GLDA or MGDA | 3.00-25.00 |
| KOH | 0.50-4.00 |
| Non-ionic surfactants | 1.00-6.00 |
| Sodium citrate | 2.00-20.00 |
| Zinc salt | 0.00-1.00 |
| Remainder (perfume, dyes, preservatives, water, enzyme stabilizer) (wt. %) | to make up to 100 |
| Alkali phase (AP) - Preparation B | |
| Phosphonate, if permitted by regulations | 0.00-7.50 |
| Thickener (acrylate or xanthan gum) | 0.01-6.00 |
| GLDA or MGDA | 3.00-25.00 |
| KOH | 0.50-4.00 |
| Soda | 5.00-20.00 |
| Monoethanolamine | 0.00-5.00 |
| Acrylate polymer | 0.00-3.00 |
| Sodium citrate | 2.00-20.00 |
| Remainder (perfume, dyes, preservatives, water, etc.) (wt. %) | to make up to 100 |

TABLE 2

Solid dishwashing detergent:

| | wt. % |
|---|---|
| Citrate, Na salt | 15-20 |
| Phosphonate (e.g., HEDP) | 0-7.5 |
| If permitted by regulations | (2.5-7.5) |
| MGDA, Na salt | 0-25 |
| Disilicate, Na salt | 5-35 |
| Soda | 10-25 |
| Silver protection | 0.0-1.0 |
| Percarbonate, Na salt | 10-15 |
| Bleach catalyst (preferably Mn-based) | 0.02-0.5 |
| Bleach activator (e.g., TAED) | 1-3 |
| Non-ionic surfactant(s), e.g., fatty alcohol alkoxylate, preferably 20-40 EO, optionally end-capped | 2.5-10 |
| Polycarboxylate | 4-10 |
| Cationic copolymer | 0-0.75 |
| Disintegrant - (e.g., crosslinked PVP) | 0-1.5 |
| Protease preparation (tq) | 0-5 |
| Amylase preparation (tq) | 0-3 |
| Perfume | 0.05-0.25 |
| Dye solution | 0.0-1 |
| Zinc salt | 0.1-0.3 |
| Sodium sulfate | 0.0-10 |
| Water | 0.0-1.5 |
| pH adjuster (e.g., citric acid) | 0-1.5 |
| Processing aids | 0-5 |

The activity-equivalent use of the relevant enzyme ensures that the respective enzymatic properties, for example the cleaning performance on certain stains, are compared even if the ratio of active substance to total protein (the values of the specific activity) diverges. In general, a low specific activity can be compensated for by adding a larger amount of protein. Furthermore, the enzymes to be examined can also be used in the same amount of substance or amount by weight if the enzymes to be examined have a different affinity for the test substrate in an activity test. The expression "same amount of substance" in this context relates to a molar use of the enzymes to be examined. The expression "equal weight" relates to the use of the same weight of the enzymes to be examined.

Otherwise, methods for determining protease activity are well known to, and routinely used by, a person skilled in the art of enzyme technology (cf., e.g., Tenside, vol. 7 (1970), pp. 125-132).

The protein concentration can be determined using known methods, for example the BCA method (bicinchoninic acid; 2,2'-bichinolyl-4,4'-dicarboxylic acid) or the Biuret method (Gornall et al., 1948, J. Biol. Chem., 177:751-766). The active protein concentration can be determined in this regard by titrating the active centers using a suitable irreversible inhibitor and determining the residual activity (Bender et al., 1966, J. Am. Chem. Soc. 88(24):5890-5913).

All conceivable types of washing or cleaning agents are to be understood as washing or cleaning agents, both concentrates and undiluted agents, for use on a commercial scale, in washing machines or for hand washing or cleaning. These include, for example, washing agents for textiles, carpets or natural fibers, for which the term washing agent is used. These also include, for example, dishwashing detergents for dishwashers (automatic dishwashing detergents) or manual dishwashing detergents or cleaners for hard surfaces such as metal, glass, porcelain, ceramics, tiles, stone, painted surfaces, plastics, wood or leather, for which the term cleaning agent is used, i.e., in addition to manual and automatic dishwashing detergents, also, for example, scouring agents, glass cleaners, WC rim blocks, etc. The washing and cleaning agents also include auxiliary washing agents which are added to the actual washing agent during manual or automatic textile washing in order to achieve a further effect. Furthermore, washing and cleaning agents also include textile pre-treatment and post-treatment agents, i.e., the agents with which the item of laundry is brought into contact before the actual washing cycle, for example to loosen stubborn stains, and also the agents which give the laundry further desirable properties such as a pleasant feel, crease resistance or low static charge in a step subsequent to the actual textile wash. The agents mentioned last include fabric softeners, inter alia.

The dishwashing detergent can be an automatic dishwashing detergent but also a manual dishwashing detergent. Automatic dishwashing detergents are cleaning agents that have been optimized for use in automatic dishwashers. Manual dishwashing detergents are optimized for hand washing. The agents are preferably automatic dishwashing detergents. The agents are particularly preferably liquid automatic dishwashing detergents.

The washing or cleaning agents, which may be in the form of powdered solids, in further-compacted particulate form, as homogeneous solutions or suspensions, may contain, in addition to an enzyme combination of protease and amylase, all known ingredients conventional in such agents, with preferably at least one other ingredient being present in the agent. The agents can in particular contain surfactants, builders, polymers, glass corrosion inhibitors, corrosion inhibitors, bleaching agents such as peroxygen compounds, bleach activators or bleach catalysts. They may also contain water-miscible organic solvents, further enzymes, enzyme stabilizers, sequestering agents, electrolytes, pH regulators and/or further auxiliaries such as optical brighteners, graying inhibitors, dye transfer inhibitors, foam regulators, as well as dyes and fragrances, and combinations thereof.

The non-ionic surfactants are a preferred component of the washing and cleaning agents, wherein non-ionic surfactants of the general formula $R^1$—CH(OH)CH$_2$O-(AO)$_w$-(A'O)$_x$-(A"O)$_y$-(A'''O)$_z$—R$^2$ are preferred, where $R^1$ represents a straight-chain or branched, saturated or mono- or polyunsaturated $C_{6-24}$-alkyl or -alkenyl functional group; $R^2$ represents a linear or branched hydrocarbon functional group having 2 to 26 carbon atoms; A, A', A''' and A'''' represent, independently of one another, a functional group from the group —CH$_2$CH$_2$, —CH$_2$CH$_2$—CH$_2$, —CH$_2$—CH(CH$_3$), —CH$_2$—CH$_2$—CH$_2$—CH$_2$, —CH$_2$—CH(CH$_3$)—CH$_2$—, —CH$_2$—CH(CH$_2$—CH$_3$), and w, x, y and z represent values between 0.5 and 120, where x, y and/or z can also be 0.

By adding the above-mentioned non-ionic surfactants of the general formula $R^1$—CH(OH)CH$_2$O-(AO)$_w$-(A'O)$_x$-(A"O)$_y$-(A'''O)$_z$—R$^2$, subsequently also referred to as "hydroxy mixed ethers," the cleaning performance of enzyme-containing preparations can surprisingly be significantly improved, both in comparison with surfactant-free systems and in comparison with systems containing alternative non-ionic surfactants, for example from the group of polyalkoxylated fatty alcohols.

By using these non-ionic surfactants having one or more free hydroxyl groups on one or both terminal alkyl functional groups, the stability of the enzymes contained in the washing or cleaning agent preparations can be improved substantially.

Particularly preferred are end-capped poly(oxyalkylated) non-ionic surfactants which, according to the formula $R^1$O[CH$_2$CH$_2$O]$_x$CH$_2$CH(OH)R$^2$, also comprise, in addition to a functional group $R^1$, which represents linear or branched, saturated or unsaturated, aliphatic or aromatic hydrocarbon functional groups having 2 to 30 carbon atoms, preferably having 4 to 22 carbon atoms, a linear or branched, saturated or unsaturated, aliphatic or aromatic hydrocarbon functional group $R^2$ having 1 to 30 carbon atoms, where x represents values between 1 and 90, preferably values between 30 and 80, and in particular values between 30 and 60.

Surfactants of the formula $R^1$O[CH$_2$CH(CH$_3$)O]$_x$[CH$_2$CH$_2$O]$_y$CH$_2$CH(OH)R$^2$ are particularly preferred, where $R^1$ represents a linear or branched aliphatic hydrocarbon functional group having 4 to 18 carbon atoms or mixtures thereof, $R^2$ represents a linear or branched hydrocarbon functional group having 2 to 26 carbon atoms or mixtures thereof, and x represents values between 0.5 and 1.5, and y represents a value of at least 15. The group of these non-ionic surfactants includes, for example, the $C_{2-26}$ fatty alcohol-(PO)$_1$-(EO)$_{15-40}$-2-hydroxyalkyl ethers, in particular including the $C_{8-10}$ fatty alcohol-(PO)$_1$-(EO)$_{22}$-2-hydroxydecyl ethers.

Particularly preferred are also end-capped poly(oxyalkylated) non-ionic surfactants of the formula $R^1$O[CH$_2$CH$_2$O]$_x$[CH$_2$CH(R$^3$)O]$_y$CH$_2$CH(OH)R$^2$, where $R^1$ and $R^2$ represent, independently of one another, a linear or branched, saturated or mono- or polyunsaturated hydrocarbon functional group having 2 to 26 carbon atoms, $R^3$ is selected, independently of one another, from —CH$_3$, —CH$_2$CH$_3$, —CH$_2$CH$_2$—CH$_3$, —CH(CH$_3$)$_2$, but preferably represents —CH$_3$, and x and y represent, independently of one another, values between 1 and 32, non-ionic surfactants where $R^3$=—CH$_3$ and values for x of from 15 to 32 and for y of 0.5 and 1.5 being very particularly preferred.

Further non-ionic surfactants that can preferably be used are the end-capped poly(oxyalkylated) non-ionic surfactants of the formula $R^1$O[CH$_2$CH(R$^3$)O]$_x$[CH$_2$]$_k$CH(OH)[CH$_2$]$_j$OR$^2$, where $R^1$ and $R^2$ represent linear or branched, saturated or unsaturated, aliphatic or aromatic hydrocarbon functional groups having 1 to 30 carbon atoms, $R^3$ represents H or a methyl, ethyl, n-propyl, iso-propyl, n-butyl, 2-butyl or 2-methyl-2-butyl functional group, x represents values between 1 and 30, and k and j represent values between 1 and 12, preferably between 1 and 5. If the value x is ≥2, each $R^3$ in the above formula $R^1O[CH_2CH(R^3)O]_x[CH_2]_kCH(OH)[CH_2]_jOR^2$ can be different. $R^1$ and $R^2$ are preferably linear or branched, saturated or unsaturated, aliphatic or aromatic hydrocarbon functional groups having 6 to 22 carbon atoms, with functional groups having 8 to 18 C atoms being particularly preferred. For the functional group $R^3$, H, —$CH_3$ or —$CH_2CH_3$ are particularly preferred. Particularly preferred values for x are in the range of from 1 to 20, in particular from 6 to 15.

As described above, each $R^3$ in the above formula can be different if x is ≥2. In this way, the alkylene oxide unit in square brackets can be varied. For example, if x represents 3, the functional group $R^3$ can be selected in order to form ethylene oxide ($R^3$=H) or propylene oxide ($R^3$=$CH_3$) units, which can be joined together in any sequence, for example (EO)(PO)(EO), (EO)(EO)(PO), (EO)(EO)(EO), (PO)(EO)(PO), (PO)(PO)(EO) and (PO)(PO)(PO). The value 3 for x has been selected here as an example and can by all means be greater, wherein the range of variation increases as the values for x increase and includes a large number of (EO) groups combined with a small number of (PO) groups, or vice versa.

Particularly preferred end-capped poly(oxyalkylated) alcohols of the above formula have values of k=1 and j=1, and therefore the previous formula is simplified to $R^1O[CH_2CH(R^3)O]_xCH_2CH(OH)CH_2OR^2$. In the formula mentioned last, $R^1$, $R^2$ and $R^3$ are as defined above and x represents numbers from 1 to 30, preferably 1 to 20, and in particular 6 to 18. Surfactants in which the functional groups $R^1$ and $R^2$ have 9 to 14 C atoms, $R^3$ represents H, and x assumes values from 6 to 15 are particularly preferred.

Finally, the non-ionic surfactants of the general formula $R^1$—CH(OH)$CH_2$O-(AO)$_w$—$R^2$ have proven to be particularly effective, where $R^1$ represents a straight-chain or branched, saturated or mono- or polyunsaturated $C_{6-24}$-alkyl or -alkenyl functional group; $R^2$ represents a linear or branched hydrocarbon functional group having 2 to 26 carbon atoms; A represents a functional group from the group —$CH_2CH_2$, —$CH_2CH_2$—$CH_2$, —$CH_2$—CH($CH_3$), and w represents values between 1 and 120, preferably 10 to 80, in particular 20 to 40. The group of these non-ionic surfactants includes, for example, $C_{4-22}$ fatty alcohol-(EO)$_{10-80}$-2-hydroxyalkyl ethers, in particular also $C_{8-12}$ fatty alcohol-(EO)$_{22}$-2-hydroxydecyl ethers and $C_{4-22}$ fatty alcohol-(EO)$_{40-80}$-2-hydroxyalkyl ethers.

Preferred washing and cleaning agents are characterized in that the washing and cleaning agent contains at least one non-ionic surfactant, preferably a non-ionic surfactant from the group of hydroxy mixed ethers, the percentage by weight of the non-ionic surfactant with respect to the total weight of the washing and cleaning agent preferably being from 0.2 to 10 wt. %, more preferably from 0.4 to 7.0 wt. % and in particular from 0.6 to 6.0 wt. %.

Preferred agents for use in automatic dishwashing methods contain, in addition to the non-ionic surfactants described above, further surfactants, in particular amphoteric surfactants. However, the proportion of anionic surfactants with respect to the total weight of these agents is preferably limited. Preferred automatic dishwashing detergents are therefore characterized in that they contain less than 5.0 wt. %, preferably less than 3.0 wt. %, particularly preferably less than 2.0 wt. %, of anionic surfactant, based on the total weight thereof. Larger quantities of anionic surfactants are not used, in particular so as to avoid excessive foaming.

Complexing agents are another preferred component of agents. Particularly preferred complexing agents are the phosphonates, provided that their use is permitted by regulations. In addition to 1-hydroxyethane-1,1-diphosphonic acid, the complexing phosphonates include a number of different compounds such as diethylenetriamine penta(methylene phosphonic acid) (DTPMP). Hydroxy alkane or amino alkane phosphonates are particularly preferred in this application. Among the hydroxy alkane phosphonates, 1-hydroxyethane-1,1-diphosphonate (HEDP) has particular significance as a cobuilder. It is preferably used as a sodium salt, the disodium salt reacting neutral and the tetrasodium salt reacting alkaline (pH 9). Possible amino alkane phosphonates preferably include ethylenediamine tetramethylene phosphonate (EDTMP), diethylenetriamine pentamethylene phosphonate (DTPMP) and the higher homologs thereof. They are preferably used in the form of the neutral-reacting sodium salt, for example as the hexasodium salt of EDTMP or as the heptasodium and octasodium salt of DTPMP. Of the class of phosphonates, HEDP is preferably used as a builder. The aminoalkane phosphonates additionally have a pronounced heavy-metal-binding power. Accordingly, it may be preferred, in particular if the agents also contain bleach, to use aminoalkane phosphonates, in particular DTPMP, or to use mixtures of the mentioned phosphonates.

A preferred agent in the context of this application contains one or more phosphonate(s) from the group aminotrimethylene phosphonic acid (ATMP) and/or the salts thereof; ethylenediamine tetra(methylene phosphonic acid) (EDTMP) and/or the salts thereof; diethylenetriamine penta (methylene phosphonic acid) (DTPMP) and/or the salts thereof; 1-hydroxyethane-1,1-diphosphonic acid (HEDP) and/or the salts thereof; 2-phosphonobutane-1,2,4-tricarboxylic acid (PBTC) and/or the salts thereof; hexamethylenediamine tetra(methylene phosphonic acid) (HDTMP) and/or the salts thereof; nitrilotri(methylenephosphonic acid) (NTMP) and/or the salts thereof.

Particularly preferred agents are those which contain 1-hydroxyethane-1,1-diphosphonic acid (HEDP) or diethylenetriamine penta(methylene phosphonic acid) (DTPMP) as phosphonates. The agent may, of course, contain two or more different phosphonates. Agents that are preferred are characterized in that the agent contains at least one complexing agent from the group of phosphonates, preferably 1-hydroxyethane-1,1-diphosphonate, the proportion by weight of the phosphonate with respect to the total weight of the agent preferably being between 0.1 and 8.0 wt. %, more preferably 0.2 and 5.0 wt. % and in particular 0.5 and 3.0 wt. %.

The agents also preferably contain builder. The builders include in particular the silicates, carbonates and organic cobuilders.

Polycarboxylates/polycarboxylic acids, polymeric polycarboxylates, aspartic acid, polyacetals, dextrins, other organic cobuilders and phosphonates are particularly noteworthy as organic cobuilders. These classes of substances are described below. Organic cobuilder substances of this kind can, if desired, be contained in amounts of up to 40 wt. %, in particular up to 25 wt. %, and preferably from 1 to 8 wt. %.

Usable organic builder substance are, for example, the polycarboxylic acids that can be used in the form of the free acids and/or the sodium salts thereof, where polycarboxylic acids are understood to mean the carboxylic acids which carry more than one acid function. For example, these are citric acid, adipic acid, succinic acid, glutaric acid, malic acid, tartaric acid, maleic acid, fumaric acid, saccharic acid, carboxylmethylinulin, monomeric and polymeric aminopolycarboxylic acids, in particular glycinediacetic acid, methylglycinediacetic acid, nitrilotriacetic acid (NTA), iminodisuccinates such as ethylenediamine-N,N'-disuccinic acid and hydroxyiminodisuccinate, ethylenediaminetetraacetic acid and polyaspartic acid, polyphosphonic acids, in particular aminotris(methylenephosphonic acid), ethylenediamine tetrakis(methylenephosphonic acid), lysine tetra(methylenephosphonic acid) and 1-hydroxyethane-1,1-diphosphonic acid, polymeric hydroxy compounds such as dextrin, and polymeric (poly)carboxylic acids, polycarboxylates which can be obtained in particular by oxidizing polysaccharides or dextrins, and/or polymeric acrylic acids, methacrylic acids, maleic acids, and mixed polymers thereof, which may also contain, polymerized in the polymer, small proportions of polymerizable substances, without a carboxylic acid functionality. Organic builder substances of this kind can, if desired, be contained in amounts of up to 50 wt. %, in particular up to 25 wt. %, and preferably from 10 to 20 wt. %.

In addition to their builder effect, the free acids typically also have the property of being an acidification component and are thus also used for setting a lower and milder pH of washing or cleaning agents. Particularly noteworthy here are citric acid, succinic acid, glutaric acid, adipic acid, gluconic acid, and any mixtures thereof. Citric acid or salts of citric acid are particularly preferably used as builder substances. Further particularly preferred builder substances are selected from methylglycinediacetic acid (MGDA), glutamic acid diacetate (GLDA), aspartic acid diacetate (ASDA), hydroxyethyl-iminodiacetate (HEIDA), iminodisuccinate (IDS), ethylenediamine disuccinate (EDDS), carboxymethyl inulin and polyaspartate.

In preferred embodiments, citric acid and/or citrate is used as the water-soluble, organic builder. It is particularly preferred to use 5 to 25 wt. %, preferably 7.5 to 12.5 wt. % of citric acid and/or 5 to 25 wt. %, preferably 7.5 to 12.5 wt. % citrate, preferably alkali citrate, more preferably sodium citrate. Citric acid/citrate can each be used in the form of their hydrates, for example citric acid can be used in the form of the monohydrate, and citrate can be used in the form of the trisodium citrate dihydrate.

Polymeric polycarboxylates are also suitable as builders. These are, for example, the alkali metal salts of polyacrylic acid or polymethacrylic acid, for example those having a relative molecular mass of from 500 to 70,000 g/mol. For the purpose of this document, the molar masses indicated for polymeric polycarboxylates are weight-average molar masses $M_w$ of the particular acid form which have been determined in principle using gel permeation chromatography (GPC), a UV detector having been used. The measurement was carried out against an external polyacrylic acid standard which, due to the structural relationship to the tested polymers, yields realistic molecular weight values. These specifications differ significantly from the molecular weight specifications for which polystyrene sulfonic acids are used as the standard. The molar masses measured against polystyrene sulfonic acids are generally considerably higher than the molar masses indicated in the present application.

Suitable polymers are in particular polyacrylates which preferably have a molecular mass of from 2,000 to 20,000 g/mol. Due to their superior solubility, the short-chain polyacrylates, which have molar masses of from 2,000 to 10,000 g/mol, and particularly preferably from 3,000 to 5,000 g/mol, may in turn be preferred from this group.

In addition, copolymeric polycarboxylates are suitable, in particular those of acrylic acid with methacrylic acid and of acrylic acid or methacrylic acid with maleic acid. Copolymers of acrylic acid with maleic acid which contain from 50 to 90 wt. % acrylic acid and from 50 to 10 wt. % maleic acid have been found to be particularly suitable. The relative molecular mass thereof, based on free acids, is generally from 2,000 to 70,000 g/mol, preferably from 20,000 to 50,000 g/mol, and in particular from 30,000 to 40,000 g/mol.

A solid agent preferably contains at least one water-soluble and/or water-insoluble, organic and/or inorganic builder. The water-soluble organic builder substances include the above-described organic builders. In particular, alkali silicates, alkali carbonates and alkali phosphates, which can be present in the form of their alkaline, neutral, or acidic sodium or potassium salts, can be used as water-soluble inorganic builder materials.

Water-dispersible inorganic builder materials for solid agents are, in particular, crystalline or amorphous alkali aluminosilicates, used in amounts of up to 50 wt. %, preferably no more than 40 wt. % and, in liquid agents, in particular in amounts of from 1 to 5 wt. %. Among these, the crystalline sodium aluminosilicates in washing agent quality, in particular zeolite A, P, and optionally X, either alone or in mixtures, for example in the form of a co-crystallizate of the zeolites A and X (Vegobond® AX, a commercial product from Condea Augusta S.p.A.), are preferred. Amounts close to the stated upper limit are preferably used in solid, particulate agents. Suitable aluminosilicates have in particular no particles having a particle size greater than 30 μm and preferably consist of up to at least 80 wt. % of particles having a size smaller than 10 μm. The calcium binding capacity, which can be determined as described in DE2412837, of said aluminosilicates is generally in the range of from 100 to 200 mg CaO per gram.

Builder substances are preferably contained in the solid agents in amounts of up to 75 wt. %, and in particular of 5 to 50 wt. %.

In addition to the above-described builders, polymers having a cleaning action can also be present in the washing or cleaning agent. The proportion by weight of the polymers having a cleaning action with respect to the total weight of washing or cleaning agents is preferably 0.1 to 20 wt. %, preferably 1.0 to 15 wt. %, and in particular 2.0 to 12 wt. %.

Sulfonic acid group-containing polymers, in particular from the group of copolymeric polysulfonates, are preferably used as polymers having a cleaning action. In addition to sulfonic acid group-containing monomer(s), these copolymeric polysulfonates comprise at least one monomer from the group of unsaturated carboxylic acids.

As unsaturated carboxylic acid(s), unsaturated carboxylic acids of the formula $R^1(R^2)C=C(R^3)COOH$ are particularly preferably used, where $R^1$ to $R^3$ represent, independently of one another, —H, —CH$_3$, a straight-chain or branched saturated alkyl functional group having 2 to 12 carbon atoms, a straight-chain or branched, mono- or polyunsaturated alkenyl functional group having 2 to 12 carbon atoms, —NH$_2$, —OH, or —COOH-substituted alkyl or alkenyl functional groups as defined above, or represent —COOH or —COOR$^4$, where R$^4$ is a saturated or unsaturated, straight-chain or branched hydrocarbon functional group having 1 to 12 carbon atoms. Particularly preferred unsaturated carboxylic acids are acrylic acid, methacrylic acid, ethacrylic acid, α-chloroacrylic acid, α-cyanoacrylic acid, crotonic acid, α-phenylacrylic acid, maleic acid, maleic anhydride, fumaric acid, itaconic acid, citraconic acid, methylene malonic acid, sorbic acid, cinnamic acid, or mixtures thereof. Unsaturated dicarboxylic acids can of course also be used.

For sulfonic acid group-containing monomers, those of the formula $R^5(R^6)C=C(R^7)-X-SO_3H$ are preferred, where $R^5$ to $R^7$ represent, independently of one another, —H, —$CH_3$, a straight-chain or branched saturated alkyl functional group having 2 to 12 carbon atoms, a straight-chain or branched, mono- or polyunsaturated alkenyl functional group having 2 to 12 carbon atoms, —$NH_2$, —OH, or —COOH-substituted alkyl or alkenyl functional groups, or represent —COOH or —$COOR^4$, where $R^4$ is a saturated or unsaturated, straight-chain or branched hydrocarbon functional group having 1 to 12 carbon atoms, and X represents an optionally present spacer group that is selected from —$(CH_2)_n$—, where n=0 to 4, —COO—$(CH_2)_k$—, where k=1 to 6, —C(O)—NH—$C(CH_3)_2$—, —C(O)—NH—$C(CH_3)_2$—$CH_2$— and —C(O)—NH—$CH(CH_2CH_3)$—.

Among these monomers, those of formulas $H_2C=CH-X-SO_3H$, $H_2C=C(CH_3)-X-SO_3H$ and $HO_3S-X-(R^6)C=C(R^7)-X-SO_3H$ are preferred, where $R^6$ and $R^7$, independently of one another, are selected from —H, —$CH_3$, —$CH_2CH_3$, —$CH_2CH_2CH_3$ and —$CH(CH_3)_2$, and X represents an optionally present spacer group that is selected from —$(CH_2)_n$—, where n=0 to 4, —COO—$(CH_2)_k$—, where k=1 to 6, —C(O)—NH—$C(CH_3)_2$—, —C(O)—NH—$C(CH_3)_2$—$CH_2$— and —C(O)—NH—$CH(CH_2CH_3)$—.

Particularly preferred sulfonic acid group-containing monomers are 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxypropanesulfonic acid, allyl sulfonic acid, methallyl sulfonic acid, allyloxybenzene sulfonic acid, methallyloxybenzene sulfonic acid, 2-hydroxy-3-(2-propenyloxy)propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethacrylamide, sulfomethylmethacrylamide, as well as mixtures of the above acids or water-soluble salts thereof.

In the polymers, the sulfonic acid groups can be present entirely or partially in neutralized form. The use of partially or fully neutralized sulfonic acid group-containing copolymers is preferred. The molar mass of the sulfo-copolymers that are preferably used can be varied in order to adapt the properties of the polymers to the desired intended use. Preferred automatic dishwashing detergents are characterized in that the copolymers have molar masses of from 2,000 to 200,000 g/mol, preferably 4,000 to 25,000 g/mol and in particular 5,000 to 15,000 g/mol.

In a further preferred embodiment, the copolymers also comprise at least one non-ionic, preferably hydrophobic, monomer, in addition to the carboxyl group-containing monomer and the sulfonic acid group-containing monomer. Through the use of these hydrophobically modified polymers, it was possible to improve, in particular, the rinsing performance of automatic dishwashing detergents.

Washing and cleaning agents containing a copolymer comprising i) carboxylic acid group-containing monomer(s), ii) sulfonic acid group-containing monomer(s), or iii) non-ionic monomer(s) are preferred. Through the use of these terpolymers, it was possible to improve the rinsing performance of automatic dishwashing detergents over comparable dishwashing detergents comprising sulfo-polymers without the addition of non-ionic monomers.

As the non-ionic monomers, monomers of the general formula $R^1(R^2)C=C(R^3)-X-R^4$ are preferably used, where $R^1$ to $R^3$ represent, independently of one another, —H, —$CH_3$ or —$C_2H_5$, X represents an optionally present spacer group selected from —$CH_2$—, —C(O)O— and —C(O)—NH—, and $R^4$ represents a straight-chain or branched saturated alkyl functional group having 2 to 22 carbon atoms or an unsaturated, preferably aromatic, functional group having 6 to 22 carbon atoms. Particularly preferred non-ionic monomers are butene, isobutene, pentene, 3-methylbutene, 2-methylbutene, cyclopentene, hexene, hexene-1, 2-methlypentene-1, 3-methlypentene-1, cyclohexene, methylcyclopentene, cycloheptene, methylcyclohexene, 2,4,4-trimethylpentene-1, 2,4,4-trimethylpentene-2, 2,3-dimethylhexene-1, 2,4-dimethylhexene-1, 2,5-dimethylhexene-1, 3,5-dimethylhexene-1, 4,4-dimethylhexane-1, ethylcyclohexene, 1-octene, α-olefins having 10 or more carbon atoms such as 1-decene, 1-dodecene, 1-hexadecene, 1-octadecene and C22-α-olefin, 2-styrene, α-methylstyrene, 3-methylstyrene, 4-propylstyrene, 4-cyclohexylstyrene, 4-dodecylstyrene, 2-ethyl-4-benzylstyrene, 1-vinyl naphthalene, 2-vinyl naphthalene, acrylic acid methyl ester, acrylic acid ethyl ester, acrylic acid propyl ester, acrylic acid butyl ester, acrylic acid pentyl ester, acrylic acid hexyl ester, methacrylic acid methyl ester, N-(methyl)acrylamide, acrylic acid-2-ethylhexyl ester, methacrylic acid-2-ethylhexyl ester, N-(2-ethylhexyl)acrylamide, acrylic acid octyl ester, methacrylic acid octyl ester, N-(octyl)acrylamide, acrylic acid lauryl ester, methacrylic acid lauryl ester, N-(lauryl)acrylamide, acrylic acid stearyl ester, methacrylic acid stearyl ester, N-(stearyl)acrylamide, acrylic acid behenyl ester, methacrylic acid behenyl ester and N-(behenyl)acrylamide, or mixtures thereof.

The proportion by weight of the sulfonic acid group-containing copolymers with respect to the total weight of agents is preferably from 0.1 to 15 wt. %, more preferably from 1.0 to 12 wt. % and in particular from 2.0 to 10 wt. %.

Possible peroxygen compounds suitable for use in the agents include, in particular, organic peroxy acids or peracid salts of organic acids, such as phthalimidopercaproic acid, perbenzoic acid, or salts of diperdodecanoic diacid, hydrogen peroxide and inorganic salts giving off hydrogen peroxide under the washing conditions, which salts include perborate, percarbonate, persilicate, and/or persulfates such as caroate, as well as hydrogen peroxide inclusion compounds such as $H_2O_2$-urea adducts. Hydrogen peroxide can also be produced by means of an enzymatic system, i.e., an oxidase and the substrate thereof. If solid peroxygen compounds are intended to be used, these may be used in the form of powders or granules, which may also be coated in a manner known in principle. The peroxygen compounds can be added to the washing liquor as such or in the form of the agents containing them, which in principle can contain all conventional washing, cleaning or disinfectant components. Particularly preferably, alkali percarbonate, or alkali perborate monohydrate is used. If an agent contains peroxygen compounds, these are present in amounts of preferably up to 50 wt. %, in particular from 5 to 30 wt. %, more preferably from 0.1 to 20 wt. %.

Compounds which, under perhydrolysis conditions, result in aliphatic peroxocarboxylic acids having preferably 1 to 10 C atoms, in particular 2 to 4 C atoms, and/or optionally substituted perbenzoic acid, may be used in the agents as bleach activators. Substances that carry the O-acyl and/or N-acyl groups of the stated number of C atoms and/or optionally substituted benzoyl groups are suitable. Preferred are polyacylated alkylene diamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenol sulfonates or carboxylates or the sulfonic or carboxylic acids thereof, in particular nonanoyloxybenzenesulfonate or isononanoyloxybenzenesulfonate or laroyloxybenzenesulfonate (NOBS or iso-NOBS or LOBS), 4-(2-decanoyl oxyethoxycarbonyloxy)-benzenesulfonate (DECOBS) or decanoyloxybenzoate (DOBA), carboxylic acid anhydrides, in particular phthalic acid anhydride, acylated polyhydric alcohols, in particular triacetin, ethylene glycol diacetate, 2,5-diacetoxy-2,5-dihydrofuran and enol esters, as well as acetylated sorbitol and mannitol or the described mixtures thereof (SORMAN), acylated sugar derivatives, in particular pentaacetyl glucose (PAG), pentaacetyl fructose, tetraacetylxylose and octaacetyl lactose, acetylated, optionally N-alkylated glucamine and gluconolactone, N-acylated lactams, for example N-benzoylcaprolactam, nitriles from which perimidic acids are formed, in particular aminoacetonitrile derivatives having a quaternized nitrogen atom, and/or oxygen-transferring sulfonimines and/or acylhydrazones. The hydrophilically substituted acyl acetals and the acyl lactams are likewise preferably used. Combinations of conventional bleach activators can also be used. Such bleach activators can, in particular in the presence of the above-mentioned hydrogen peroxide-yielding bleaching agents, be present in the customary quantity range, preferably in amounts of from 0.5 to 10 wt. %, and in particular 1 to 8 wt. %, based on the total agent, but are preferably entirely absent when percarboxylic acid is used as the sole bleaching agent.

In addition to or instead of the conventional bleach activators, sulfonimines and/or bleach-boosting transition metal salts or transition metal complexes may also be contained in solid agents as what are referred to as bleach catalysts.

A dishwashing detergent also comprises a bleach activator. These substances are preferably bleach-intensifying transition metal salts or transition metal complexes such as Mn, Fe, Co, Ru or Mo salen complexes or carbonyl complexes. Mn, Fe, Co, Ru, Mo, Ti, V, and Cu complexes having N-containing tripod ligands as well as Co, Fe, Cu, and Ru ammine complexes can also be used as bleach catalysts.

Complexes of manganese in oxidation stage II, III, IV, or IV are particularly preferably used which preferably contain one or more macrocyclic ligands with the donor functions N, NR, PR, O and/or S. Preferably, ligands are used which have nitrogen donor functions. It is particularly preferred to use bleach catalyst(s) in the agents which contain, as macromolecular ligands, 1,4,7-trimethyl-1,4,7-triazacyclononane (Me-TACN), 1,4,7-triazacyclononane (TACN), 1,5,9-trimethyl-1,5,9-triazacyclododecane (Me-TACD), 2-methyl-1,4,7-trimethyl-1,4,7-triazacyclononane (Me/Me-TACN), and/or 2-methyl-1,4,7-triazacyclononane (Me/TACN). Suitable manganese complexes are, for example, $[Mn^{III}_2(\mu-O)_1(\mu-OAc)_2(TACN)_2](ClO_4)_2$, $[MN^{III}MN^{IV}(\mu-O)_2(\mu-OAc)_1(TACN)_2](BPh_4)_2$, $[MN^{IV}_4(\mu-O)_6(TACN)_4](ClO_4)_4$, $[MN^{III}_2(\mu-O)_1(\mu-OAc)_2(Me-TACN)_2](ClO_4)_2$, $[MN^{III}MN^{IV}(\mu-O)_1(\mu-OAc)_2(Me-TACN)_2](ClO_4)_3$, $[MN^{IV}_2(\mu-O)_3(Me-TACN)_2](PF_6)_2$ and $[MN^{IV}_2(\mu-O)_3(Me/Me-TACN)_2](PF_6)_2$ ($OAc=OC(O)CH_3$).

Dishwashing detergents, in particular automatic dishwashing detergents, characterized in that they contain a bleach catalyst selected from the group of the bleach-intensifying transition metal salts and transition metal complexes, preferably from the group of the complexes of manganese with 1,4,7-trimethyl-1,4,7-triazacyclononane (Me-TACN) or 1,2,4,7-tetramethyl-1,4,7-triazacyclononane (Me/Me-TACN) are preferred, since the aforementioned bleach catalysts in particular can significantly improve the cleaning result.

The aforementioned bleach-intensifying transition metal complexes, in particular having the central atoms Mn and Co, are preferably used in an amount of up to 5 wt. %, in particular 0.0025 to 1 wt. % and particularly preferably 0.01 to 0.30 wt. %, in each case based on the total weight of the bleach catalyst-containing agent. In special cases, however, more bleach catalyst can also be used.

The cleaning agents can contain an organic solvent as a further component. Adding organic solvents has an advantageous effect on the enzyme stability and cleaning performance of these agents. Preferred organic solvents are derived from the group of monohydric or polyhydric alcohols, alkanolamines or glycol ethers. The solvents are preferably selected from ethanol, n-propanol or i-propanol, butanol, glycol, propanediol or butanediol, glycerol, diglycol, propyl diglycol or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether or propylene glycol propyl ether, dipropylene glycol methyl ether or dipropylene glycol ethyl ether, methoxytriglycol, ethoxytriglycol or butoxytriglycol, 1-butoxyethoxy-2-propanol, 3-methyl-3-methoxybutanol, propylene-glycol-t-butylether, and mixtures of these solvents. The proportion by weight of these organic solvents with respect to the total weight of the agents is preferably from 0.1 to 10 wt. %, more preferably from 0.2 to 8.0 wt. % and in particular from 0.5 to 5.0 wt. %. A particularly preferred organic solvent which is particularly effective in stabilizing the cleaning agents is glycerol, as well as 1,2-propylene glycol. Liquid agents which contain at least one polyol, preferably from the group of glycerol and 1,2-propylene glycol, are preferred, the proportion by weight of the polyol with respect to the total weight of the cleaning agent preferably being from 0.1 to 10 wt. %, more preferably from 0.2 to 8.0 wt. %, and in particular from 0.5 to 5.0 wt. %. Other preferred organic solvents are the organic amines and alkanolamines. The agents preferably contain these amines in amounts of from 0.1 to 10 wt. %, more preferably from 0.2 to 8.0 wt. % and in particular from 0.5 to 5.0 wt. %, in each case based on the total weight thereof. Ethanolamine is a particularly preferred alkanolamine.

A further preferred component of the washing and cleaning agents is a sugar alcohol (alditol). The group of alditols includes non-cyclic polyols of the formula $HOCH_2[CH(OH)]_nCH_2OH$. The alditols include, e.g., mannitol, isomalt, lactitol, sorbitol and xylitol, threitol, erythritol and arabitol. Sorbitol has been found to be particularly advantageous with regard to enzyme stability. The percentage by weight of the sugar alcohol with respect to the total weight of the washing and cleaning agent is preferably from 1.0 to 10 wt. %, more preferably from 2.0 to 8.0 wt. % and in particular from 3.0 to 6.0 wt. %.

In one embodiment, a washing or cleaning agent comprises
  5 to 70 wt. %, and in particular 5 to 30 wt. % surfactants and/or
  10 to 65 wt. %, and in particular 12 to 60 wt. % water-soluble or water-dispersible inorganic builder material and/or 0.5 to 10 wt. %, and in particular 1 to 8 wt. %, water-soluble organic builders and/or 0.01 to 15 wt. % solid inorganic and/or organic acids or acid salts and/or 0.01 to 5 wt. % complexing agents for heavy metals and/or 0.01 to 5 wt. % graying inhibitor and/or 0.01 to 5 wt. % dye transfer inhibitor and/or 0.01 to 5 wt. % suds suppressor.

Optionally, the agent can also comprise optical brighteners, preferably from 0.01 to 5 wt. %.

An agent advantageously contains the protease in an amount of from 2 µg to 20 mg, preferably from 5 µg to 17.5 mg, more preferably from 20 µg to 15 mg and most particularly preferably from 50 µg to 10 mg per g of the agent. Further, the protease contained in the agent, and/or other ingredients of the agent, may be coated with a substance which is impermeable to the enzyme at room temperature or in the absence of water, and which becomes permeable to the enzyme under conditions of use of the agent. Such an embodiment is thus characterized in that the enzyme is coated with a substance which is impermeable to the enzyme at room temperature or in the absence of water. Furthermore, the washing or cleaning agent itself may also be packaged in a container, preferably an air-permeable container, from which it is released shortly before use or during the washing/rinsing process.

These embodiments include all solid, powdered, granular, tablet-form, liquid, gel or pasty administration forms of agents, which may optionally also consist of a plurality of phases and can be present in compressed or uncompressed form. The agent may be present as a flowable powder, in particular having a bulk density of from 300 to 1200 g/l, in particular from 500 to 900 g/l or from 600 to 850 g/l. The solid dosage forms of the agent also include extrudates, granules, tablets or pouches containing solid agents, which can be present both in large containers and in portions. Alternatively, the agent may also be in liquid, gel or pasty form, for example in the form of a non-aqueous liquid washing agent or a non-aqueous paste or in the form of an aqueous liquid washing agent or a water-containing paste. The agent may also be present as a single-component system. Such agents consist of one phase. Alternatively, an agent may also consist of a plurality of phases (multi-component system). Such an agent is accordingly divided into several components, for example two liquid, two solid or one liquid and one solid phase. In a further embodiment, the washing or cleaning agent is therefore characterized by being divided into a plurality of components. The water-based and/or organic solvent-based liquid product formats may be present in thickened form, namely in the form of gels.

A substance, e.g., a composition or an agent, is solid if it is in a solid physical state at 25° C. and 1,013 mbar.

A substance, e.g., a composition or an agent, is liquid if it is in a fluid physical state at 25° C. and 1,013 mbar. Liquid also includes gel form.

The agents are preferably present in liquid form. Preferred washing and cleaning agents contain more than 40 wt. %, preferably between 50 and 90 wt. % and in particular between 60 and 80 wt. %, water, based on the total weight thereof.

Liquid washing or cleaning agents are preferably formulated in multiphase form, i.e., by combining two or more different liquid washing or cleaning agents which are separate from one another. This type of formulation increases the stability of the washing or cleaning agent and improves the cleaning performance thereof. A preferred washing or cleaning agent is characterized in that it comprises a packaging means and two liquid washing or cleaning agents A and B which are separate from one another in said packaging means, wherein composition A contains a) at least one modified protease;
b) at least one amylase,
c) 10 to 84.9 wt. % builder(s);
d) 15 to 89.9 wt. % water; and composition B contains e) 10 to 75 wt. % builder(s);
f) 25 to 90 wt. % water.

The cleaning agents described herein, in particular dishwashing detergents, even more preferably automatic dishwashing detergents, are preferably pre-packaged into dosing units. These dosing units preferably comprise the amount of active cleaning substances necessary for a cleaning cycle. Preferred dosing units have a weight of between 12 and 30 g, preferably between 14 and 26 g and in particular between 15 and 22 g. The volume of the aforementioned dosing units and the spatial shape thereof are particularly preferably selected so that the pre-packaged units can be dosed via the dosing chamber of a dishwasher. The volume of the dosing unit is therefore preferably between 10 and 35 ml, preferably between 12 and 30 ml.

The agents, in particular automatic dishwashing detergents, in particular the prefabricated dosing units, particularly preferably have a water-soluble wrapping. The water-soluble wrapping is preferably made from a water-soluble film material selected from the group consisting of polymers or polymer mixtures. The wrapping may be made up of one or of two or more layers of the water-soluble film material. The water-soluble film material of the first layer and of the additional layers, if present, may be the same or different. Particularly preferred are films which, e.g., can be glued and/or sealed to form packaging such as tubes or sachets after they have been filled with an agent.

The water-soluble packaging may have one or more chambers. The agent may be contained in one or more chambers, if present, of the water-soluble wrapping. The amount of agent preferably corresponds to the full or half dose required for a dishwashing cycle.

It is preferable for the water-soluble wrapping to contain polyvinyl alcohol or a polyvinyl alcohol copolymer. Water-soluble wrappings containing polyvinyl alcohol or a polyvinyl alcohol copolymer exhibit good stability with a sufficiently high level of water solubility, in particular cold-water solubility. Suitable water-soluble films for producing the water-soluble wrapping are preferably based on a polyvinyl alcohol or a polyvinyl alcohol copolymer of which the molecular weight is in the range of from 5,000 to 1,000,000 g/mol, preferably from 20,000 to 500,000 g/mol, particularly preferably from 30,000 to 100,000 g/mol, and in particular from 40,000 to 80,000 g/mol. Suitable water-soluble films for use in the water-soluble wrappings of the water-soluble packaging are films which are sold by MonoSol LLC, e.g, under the names M8630, C8400 or M8900. Other suitable films include films under the names Solublon® PT, Solublon® GA, Solublon® KC or Solublon® KL from Aicello Chemical Europe GmbH, or the VF-HP films from Kuraray.

Such water-soluble wrappings are also already described in patent applications WO2004031338A and WO2003099985A, the disclosure of which is hereby incorporated by reference in its entirety.

The enzymes are generally not provided in the form of pure protein, but rather in the form of stabilized, storable and transportable preparations. These pre-packaged preparations include, e.g., the solid preparations obtained through granulation, extrusion, or lyophilization or, in particular in the case of liquid or gel agents, solutions of the enzymes, which are advantageously maximally concentrated, have a low water content, and/or are supplemented with stabilizers or other auxiliaries. Moreover, it is possible to formulate two or more enzymes together such that a single granule exhibits a plurality of enzyme activities.

Washing or cleaning agents can exclusively contain an enzyme combination of at least one *Bacillus gibsonii* protease, as defined herein, and an amylase. Alternatively, they may also contain other enzymes in a concentration that is expedient for the effectiveness of the agent. A further embodiment is therefore represented by agents which further comprise one or more further enzymes. All enzymes which can develop catalytic activity in the agent, in particular a lipase, cellulase, hemicellulase, mannanase, tannanase, xylanase, xanthanase, xyloglucanase, β-glucosidase, pectinase, carrageenanase, perhydrolase, oxidase, oxidoreductase, and mixtures thereof, can preferably be used as enzymes. Enzymes are contained in the agent advantageously in an amount of from $1\times10^{-8}$ to 5 wt. %, in each case based on active protein. Increasingly preferably, each further enzyme is contained in agents in an amount of from $1\times10^{-7}$ to 3 wt. %, from 0.00001 to 1 wt. %, from 0.00005 to 0.5 wt. %, from 0.0001 to 0.1 wt. % and particularly preferably from 0.0001 to 0.05 wt. %, based on active protein. Particularly preferably, the enzymes exhibit synergistic cleaning performance against specific stains or spots, i.e., the enzymes contained in the agent composition support one another in their cleaning performance. Very particularly preferably, there is such synergism between the protease contained and a further enzyme of an agent, including in particular between said protease and an amylase and/or a lipase and/or a mannanase and/or a cellulase and/or a pectinase. Synergistic effects may arise not only between different enzymes, but also between one or more enzymes and other ingredients of the agent.

Cellulases (endoglucanases, EG) which can be packaged comprise, for example, the fungal cellulase preparation which is rich in endoglucanase (EG) and the refinements thereof which are provided by Novozymes under the trade name Celluzyme®. The products Endolase® and Carezyme®, also available from Novozymes, are based on 50 kD-EG and 43 kD-EG, respectively, from *Humicola insolens* DSM 1800. Further commercial products from this company that can be used are Cellusoft®, Renozyme®, and Celluclean®. It is also possible to use cellulases, for example, which are available from AB Enzymes, under the trade names Ecostone® and Biotouch®, and which are, at least in part, based on 20 kD-EG from *Melanocarpus*. Further cellulases from AB Enzymes are Econase® and Ecopulp®. Further suitable cellulases are from *Bacillus* sp. CBS 670.93 and CBS 669.93, where the cellulase from *Bacillus* sp. CBS 670.93 is available from Danisco/Genencor under the trade name Puradax®. Further commercial products that can be used from Danisco/Genencor are "Genencor detergent cellulase L" and IndiAge®Neutra.

Examples of lipases or cutinases, which are used in particular because of their triglyceride-cleaving activities, but also to generate peracids from suitable precursors in situ, include, for example, the lipases originally obtained from *Humicola lanuginosa* (*Thermomyces lanuginosus*) or further developed therefrom, in particular those with one or more of the following amino acid exchanges starting from the lipase mentioned in positions D96L, T213R and/or N233R, particularly preferably T213R and N233R. Lipases are sold, for example, by the Novozymes company under the trade names Lipolase®, Lipolase® Ultra, LipoPrime®, Lipozyme® and Lipex®. Another lipase that can be used advantageously is available from Novozymes under the trade name Lipoclean®. Moreover, the cutinases which have been originally isolated from *Fusarium solani pisi* and *Humicola insolens* can also be used, for example. Lipases that can also be used are available from Amano under the names Lipase CE®, Lipase P®, Lipase B®, and Lipase CES®, Lipase AKG®, *Bacillus* sp. Lipase®, Lipase AP®, Lipase M-AP® and Lipase AML®. From the company Danisco/Genencor, for example, lipases or cutinases can be used whose starting enzymes were originally isolated from *Pseudomonas mendocina* and *Fusarium solanii*. The preparations M1 Lipase® and Lipomax® originally marketed by Gist-Brocades (now Danisco/Genencor), the enzymes marketed by Meito Sangyo KK, under the names Lipase MY-30®, Lipase OF® and Lipase PL®, and the product Lumafast® from Genencor should be mentioned as other important commercial products.

In order to increase the bleaching effect, oxidoreductases such as oxidases, oxygenases, catalases, peroxidases such as halo-, chloro-, bromo-, lignin, glucose, or manganese peroxidases, dioxygenases or laccases (phenoloxidases, polyphenoloxidases) can be used. Advantageously, organic, particularly preferably aromatic compounds that interact with the enzymes are additionally added in order to potentiate the activity of the relevant oxidoreductases (enhancers) or, in the event of greatly differing redox potentials, to ensure the flow of electrons between the oxidizing enzymes and the contaminants (mediators).

A further object is a method for cleaning textiles and/or hard surfaces, in particular dishes, characterized in that in at least one method step, an agent is used.

A preferred cleaning method is an automatic dishwashing method. The cleaning agent can be dispensed into the cleaning liquor in such a method for example by means of the dispensing chamber in the door or by means of an additional dispensing container in the interior of the dishwasher. Alternatively, the cleaning agent can also be applied directly to the dirty dishes or to one of the interior walls of the dishwasher, for example the inside of the door. The method is carried out in the interior of a commercially available dishwasher. In the case of a dishwasher, the cleaning program can generally be selected and determined by the user before the dishwashing method is carried out. The dishwasher cleaning program used in the method comprises at least one prewash cycle and one cleaning cycle. Cleaning programs which comprise further cleaning or rinsing cycles, e.g., a rinse cycle, are preferred. The method is particularly preferably part of a cleaning program comprising a prewash cycle, a cleaning cycle and a rinse cycle. The method is preferably used in connection with cleaning programs in which the washing liquor is heated during the cleaning cycle. In a preferred embodiment of the method, the cleaning cycle during which the cleaning agent is dispensed into the interior of the dishwasher is characterized in that the temperature of the cleaning liquor during said cycle rises to values above 30° C., preferably above 40° C. and in particular above 50° C.

In various embodiments, the method described above is characterized in that the protease is used at a temperature of from 0 to 100° C., preferably 10 to 70° C., more preferably 30 to 50° C. and most preferably at 45° C.

Alternative embodiments of this subject matter are also represented by methods for cleaning textiles as well as methods for treating textile raw materials or for textile care, in which an agent becomes active in at least one method step. Among these, methods for textile raw materials, fibers or textiles comprising natural constituents are preferred, and very particularly for such materials, fibers or textiles comprising wool or silk.

Another subject matter is the use of an agent for cleaning textiles and/or hard surfaces, in particular such that the combination of amylase and protease in an amount of from 40 µg to 4 g, preferably from 50 µg to 3 g, particularly preferably from 100 µg to 2 g and very particularly preferably from 200 µg to 1 g, is used.

All aspects, objects and embodiments described for the protease and agents containing it are also applicable to this subject matter. Express reference is therefore made here to the disclosure at the appropriate point, with the note that this disclosure also applies to the above-described use.

EXAMPLES

Determination of the Cleaning Performance of a Dishwashing Detergent

A commercially available two-part dishwashing detergent composition was used.

TABLE 3

Compositions of the gel phase in wt. %:

|  | G1 | G2 | G3 | G4 | G5 | G6 |
|---|---|---|---|---|---|---|
| Water-free zinc acetate | 0.5 | 0.5 | 1.0 | 1.0 | 2.0 | 2.0 |
| Polymer comprising acrylic acid-containing and amidopropyl sulfonic acid-containing monomers, Acusol ® 588 | 11 | 0 | 0 | 11 | 11 | 0 |
| Polymer comprising acrylic acid-containing and amidopropyl sulfonic acid-containing monomers, Acusol ® 590 | 0 | 11 | 11 | 0 | 0 | 11 |
| Glycerol | 25 | 25 | 25 | 25 | 25 | 25 |
| 1,3-propanediol | 30 | 30 | 30 | 30 | 30 | 30 |
| PEG 400 | 15 | 15 | 15 | 15 | 15 | 15 |
| PVOH (Mowiol 4-88) | 15 | 15 | 15 | 15 | 15 | 15 |
| Misc. (including processing aids, pH adjuster, perfume, dye) | To make up to 100 | To make up to 100 | To make up to 100 | To make up to 100 | To make up to 100 | To make up to 100 |

Corresponding formulations have been prepared according to Table 3. The gel phases were stirred at temperatures of 110° C. Shortly before dosing the gel phases, protease granulates 1 or 2 were dosed into the still-hot compositions.

The corresponding gel phases (1.5 g) were then packaged together with a solid phase according to Table 4 (17.0 g) in single portions (pouches) with a total weight of 18.5 g.

TABLE 4

Composition of the gel phase

|  | Wt. % active substance |
|---|---|
| Citrate, Na salt | 35 |
| Phosphonate (HEDP) | 3 |
| Soda | 25 |
| Percarbonate, Na salt | 10 |
| Bleach catalyst (Mn-TACN) | 0.05 |
| Bleach activator (TAED) | 1 |
| Non-ionic surfactants | 2.5 |
| Polycarboxylate, (Acusol ® 588) | 5 |
| Amylase preparation (tq) | 1.5 |
| Sodium sulfate, dye, perfume | To make up to 100 |

Cleaning Performance

Using the single portions prepared in this way (gel phase G1, solid phase, Table 4), the cleaning performance of the compositions was determined according to the IKW method in a Miele GSL, Eco 45° program, at 21° dH.

TABLE 5

Results

|  | Cleaning performance | Creme brûlée | Egg yolk | Spaghetti |
|---|---|---|---|---|
| E1 | G1 + protease granulate 1 (30 mg/job) | 7.2 | 4.7 | 3.5 |
| E2 | G1 + protease granulate 2 (30 mg/job) | 8.4 | 8.0 | 4.5 |

Both protease granulates each contain 30 mg of active protein/job (corresponding to the active enzyme protein content per single portion, suitable for a cleaning application). The protease granulate 1 contains a combination of protease 1a (protease according to SEQ ID NO:6 from WO2016000973) and protease 1b (Ovozyme®, ex Novozymes) in a ratio of 1.5:1. The protease granulate 2 contains a protease according to SEQ ID NO:5 from WO2017215925.

Surprisingly, it has been found that when protease granulate 2 is used, in addition to a particularly good cleaning performance on protein-containing stains, a positive effect on the starch-based stains from spaghetti can also be observed.

The invention claimed is:

1. A washing or cleaning agent comprising:
   at least one protease with a conserved amino acid sequence having at least 70% sequence identity with the amino acid sequence specified in SEQ ID NO: 1 over the entire length thereof and has at least one amino acid substitution selected from the group corresponding to the positions of: 12, 43, 122, 127, 154, 156, 160, 211, 212, and 222, in each case based on the numbering according to SEQ ID NO:1; and
   at least one amylase.

2. The washing or cleaning agent according to claim 1, wherein the at least one protease has at least one amino acid substitution selected from the group consisting of Q12L, I43V, M122L, D127P, N154S, T156A, G160S, M211N, M211L, P212D, P212H, or A222S, in each case based on the numbering according to SEQ ID NO: 1.

3. The washing or cleaning agent according to claim 1, wherein the at least one protease has one of the following amino acid substitution variants, in each case based on the numbering according to SEQ ID NO:1:
   (i) I43V;
   (ii) M122L, N154S, and T156A;
   (iii) M211N and P212D;
   (iv) M211L and P212D;
   (v) G160S;
   (vi) D127P, M211L, and P212D;
   (vii) P212H; or
   (viii) Q12L, M122L, and A222S.

4. The washing or cleaning agent according to claim 1, wherein the at least one amylase is selected from:
   a) an α-amylase with a conserved amino acid sequence having at least 80% identity with the amino acid sequence specified in SEQ ID NO:5 over the entire length thereof and has at least one amino acid substitution at one of the positions 172, 202, 208, 255, and 261 in the numbering according to SEQ ID NO:5;
   b) an α-amylase with a conserved amino acid sequence having at least 60% identity with the amino acid sequence specified in SEQ ID NO:6 over the entire length thereof and has at least one amino acid substitution at one of the positions 9, 26, 30, 33, 82, 37, 106, 118, 128, 133, 149, 150, 160, 178, 182, 186, 193, 195, 202, 203, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482, and 484 and/or a deletion at one of the positions 183 and 184 in the numbering according to SEQ ID NO:6;
   c) an α-amylase with a conserved amino acid sequence having at least 90% identity with the amino acid sequence specified in SEQ ID NO:7 over the entire length thereof and has at least one substitution and/or deletion at one of the positions 93, 116, 118, 129, 133, 134, 140, 142, 146, 147, 149, 151, 152, 169, 174, 183, 184, 186, 189, 193, 195, 197, 198, 200, 203, 206, 210, 212, 213, 235, 243, 244, 260, 262, 284, 303, 304, 320, 338, 347, 359, 418, 431, 434, 439, 447, 458, 469, 476, and 477 in the numbering according to SEQ ID NO:7;
   d) an α-amylase with a conserved amino acid sequence having at least 89% identity with the amino acid sequence specified in SEQ ID NO:8 over the entire length thereof and at least one deletion at one of the positions 180, 181, 182, 183, and 184 in the numbering according to SEQ ID NO:8, and/or has at least one substitution at one of the positions 405, 421, 422, and 428 in the numbering according to SEQ ID NO:8 selected from the group consisting of I405L, A421H, A422P, or A428T;
   e) or combinations thereof.

5. The washing or cleaning agent according to claim 1, further comprising at least one second protease, at least one second amylase, or both.

6. The washing or cleaning agent according to claim 4, further comprising at least one second amylase different from the at least one first amylase; wherein the at least one second amylase is selected from the group consisting of:
   a) an α-amylase with a conserved amino acid sequence having at least 80% identity with the amino acid sequence specified in SEQ ID NO:5 over the entire length thereof and has at least one amino acid substitution at one of the positions 172, 202, 208, 255, and 261 in the numbering according to SEQ ID NO:5;
   b) an α-amylase with a conserved amino acid sequence having at least 60% identity with the amino acid sequence specified in SEQ ID NO:6 over the entire length thereof and has at least one amino acid substitution at one of the positions 9, 26, 30, 33, 82, 37, 106, 118, 128, 133, 149, 150, 160, 178, 182, 186, 193, 195, 202, 203, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482, and 484 and/or a deletion at one of the positions 183 and 184 in the numbering according to SEQ ID NO:6;
   c) an α-amylase with a conserved amino acid sequence having at least 90% identity with the amino acid sequence specified in SEQ ID NO:7 over the entire length thereof and has at least one substitution and/or deletion at one of the positions 93, 116, 118, 129, 133, 134, 140, 142, 146, 147, 149, 151, 152, 169, 174, 183, 184, 186, 189, 193, 195, 197, 198, 200, 203, 206, 210, 212, 213, 235, 243, 244, 260, 262, 284, 303, 304, 320, 338, 347, 359, 418, 431, 434, 439, 447, 458, 469, 476, and 477 in the numbering according to SEQ ID NO:7;
   d) an α-amylase with a conserved amino acid sequence having at least 89% identity with the amino acid sequence specified in SEQ ID NO:8 over the entire length thereof and at least one deletion at one of the positions 180, 181, 182, 183, and 184 in the numbering according to SEQ ID NO:8, and/or has at least one substitution at one of the positions 405, 421, 422, and 428 in the numbering according to SEQ ID NO:8 selected from the group consisting of I405L, A421H, A422P, or A428T;
   e) or combinations thereof.

7. The washing or cleaning agent according to claim 5, wherein the at least one second protease is selected from:
   a) a protease with a conserved amino acid sequence having at least 80% identity with the amino acid sequence specified in SEQ ID NO:2 over the entire length thereof and has at least one amino acid substitution at one of the positions 9, 15, 66, 212, and 239 in the numbering according to SEQ ID NO:2;
   b) a protease with a conserved amino acid sequence having at least 80% identity with the amino acid sequence specified in SEQ ID NO:2 over the entire length thereof and has an amino acid substitution at the position 97 and an insertion of an amino acid between the amino acids at positions 97 and 98 in the numbering according to SEQ ID NO:2;
   c) a protease with a conserved amino acid sequence having at least 80% identity with the amino acid sequence specified in SEQ ID NO:3 over the entire length thereof and has at least one amino acid substitution at one of the positions 3, 4, 99, and 199 in the numbering according to SEQ ID NO:3, and;

d) a protease with a conserved amino acid sequence having at least 80% identity with the amino acid sequence specified in SEQ ID NO:4 over the entire length thereof and has at least one amino acid substitution at one of the positions 32, 33, 48-54, 58-62, 94-107, 116, 123-133, 150, 152-156, 158-161, 164, 169, 175-186, 197, 198, and 203-216 in the numbering according to SEQ ID NO:4;

e) and combinations thereof.

8. The washing or cleaning agent according to claim 1, wherein the proportion by weight of each of the amylases and/or each of the proteases, based on the corresponding active protein, with respect to the total weight of the agent in each case ranges from $1 \times 10^{-8}$ to 5 wt. %.

9. The washing or cleaning agent according to claim 1, further comprising at least one further enzyme selected from the group consisting of cellulases, hemicellulases, mannanases, tannases, xylanases, xanthanases, xyloglucanases, β-glucosidases, pectinases, carrageenases, perhydrolases, oxidases, oxidoreductases, lipase, and combinations thereof.

10. The washing or cleaning agent according to claim 1, further comprising at least one further component selected from the group consisting of builders, surfactants, polymers, bleaching agents, bleach catalysts, bleach activators, corrosion inhibitors, glass corrosion inhibitors, disintegration auxiliaries, fragrances, and perfume carriers.

11. A dishwashing agent comprising the washing or cleaning agent according to claim 1.

* * * * *